US011556296B2

(12) United States Patent
Sako

(10) Patent No.: US 11,556,296 B2
(45) Date of Patent: Jan. 17, 2023

(54) PRINTING SYSTEM INCLUDING PRINT SERVICE CANCELLATION, PRINTING APPARATUS, AND CONTROL METHOD

(71) Applicant: CANON KABUSHIKI KAISHA, Tokyo (JP)

(72) Inventor: Ritsuto Sako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/197,165

(22) Filed: Mar. 10, 2021

(65) Prior Publication Data

US 2021/0294550 A1    Sep. 23, 2021

(30) Foreign Application Priority Data

Mar. 23, 2020 (JP) .............................. JP2020-051776

(51) Int. Cl.
    *G06F 3/12* (2006.01)
(52) U.S. Cl.
    CPC .......... *G06F 3/1273* (2013.01); *G06F 3/1203* (2013.01); *G06F 3/126* (2013.01); *G06F 3/1288* (2013.01)
(58) Field of Classification Search
    None
    See application file for complete search history.

(56) References Cited

U.S. PATENT DOCUMENTS

| 6,859,832 B1* | 2/2005 | Gecht ..................... G06F 3/126 709/224 |
| 7,574,545 B2* | 8/2009 | Keeney ............. H04N 1/00344 358/1.15 |
| 7,986,431 B2* | 7/2011 | Emori ................... G06F 3/1204 358/1.15 |
| 8,898,570 B2* | 11/2014 | Nemoto ................ G06F 21/608 715/741 |
| 10,296,266 B2 | 5/2019 | Sako |
| 10,509,611 B2* | 12/2019 | Okazawa .............. G06F 3/1234 |
| 2018/0129454 A1 | 5/2018 | Sako |
| 2019/0369934 A1* | 12/2019 | Inoue .................... G06F 3/1274 |
| 2020/0374187 A1 | 11/2020 | Sako |

FOREIGN PATENT DOCUMENTS

JP    2018-151981 A    9/2018

* cited by examiner

*Primary Examiner* — Dov Popovici
(74) *Attorney, Agent, or Firm* — Venable LLP

(57) ABSTRACT

A printing apparatus determines, upon receiving information from a server that printing of a print job acquired from the server should be cancelled after the start of print processing of the print job, whether the cancellation should be accepted. If it is determined the cancellation should be accepted, execution of the print processing is cancelled and terminated and the server is notified, and if it is determined the cancellation should not be accepted, the server is notified of an execution result indicating that output of the print job has been completed. The printing apparatus further notifies the server of the execution result indicating that output of the print job has been completed when the printing of the print job has been successfully completed before cancellation and termination of the execution of the print processing, even in a case where it is determined that the cancellation should be accepted.

10 Claims, 17 Drawing Sheets

F I G. 10
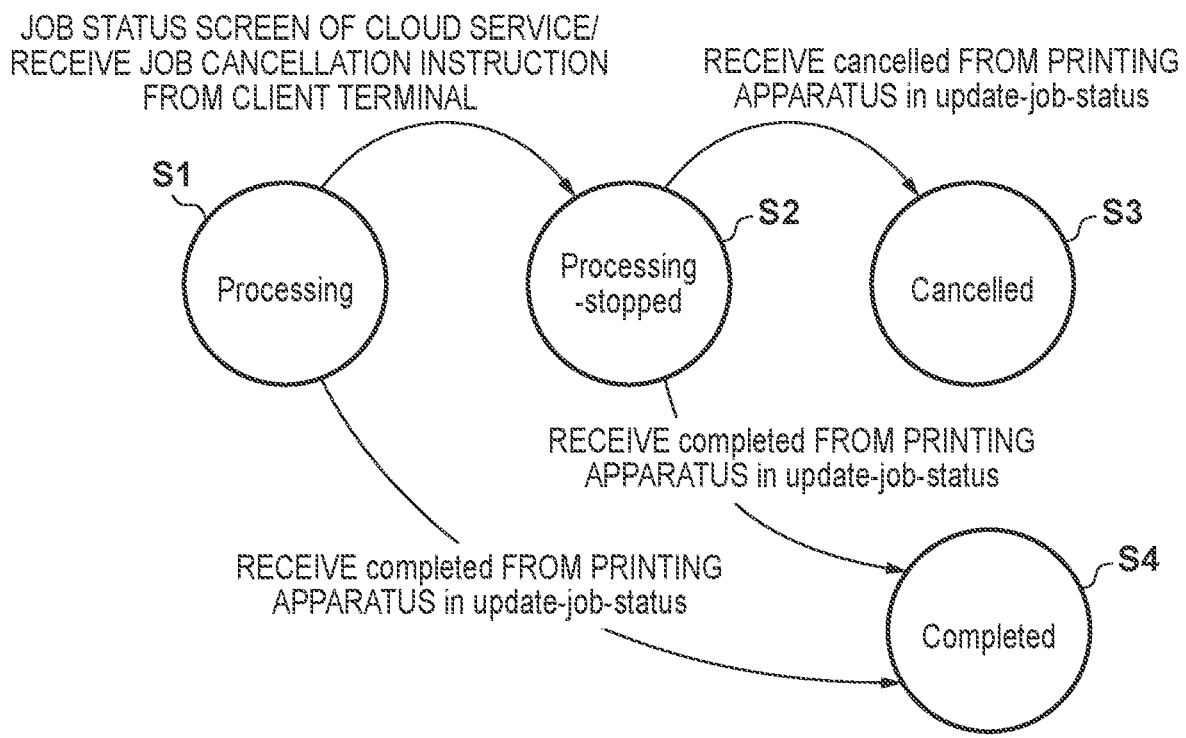

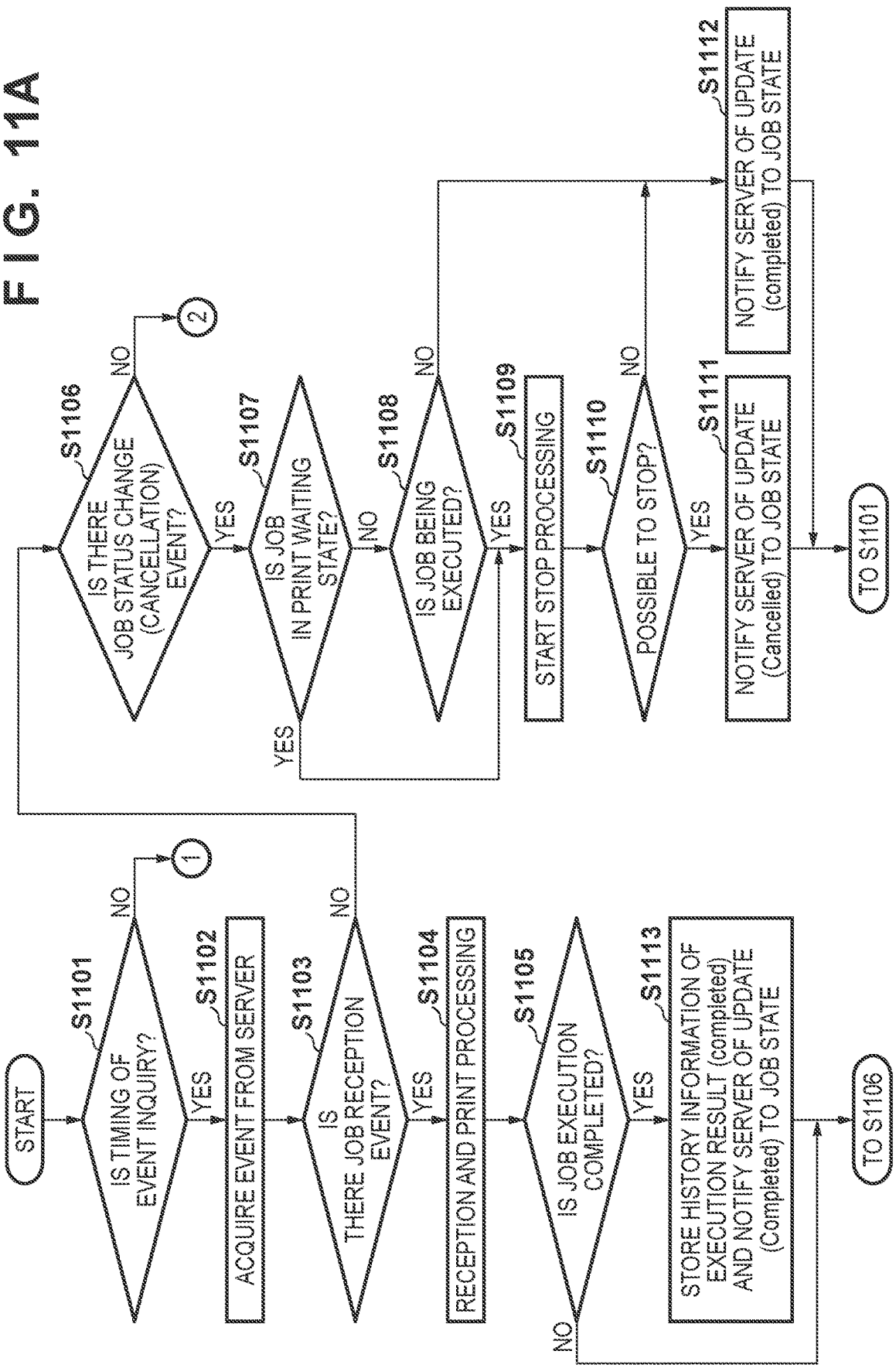

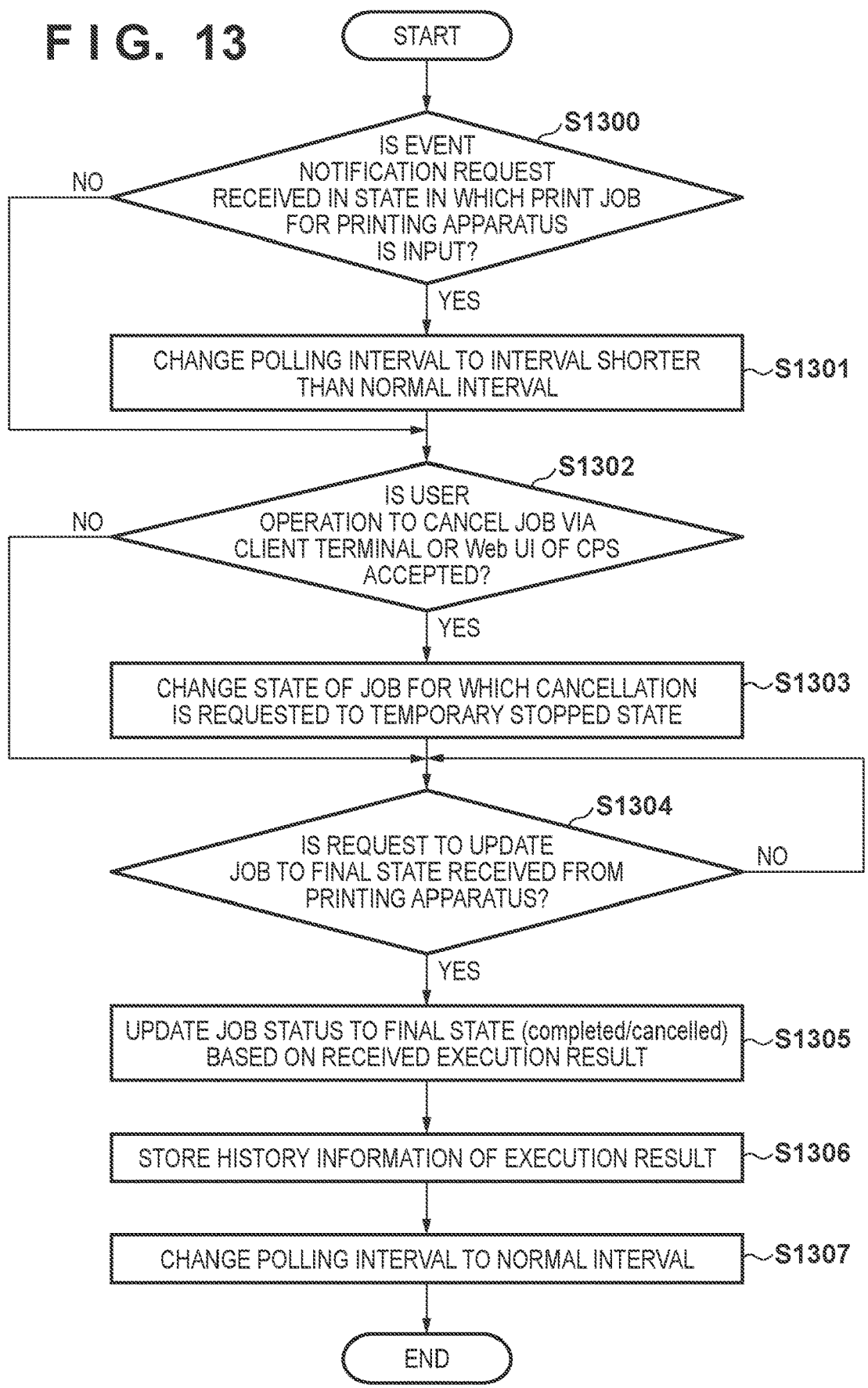

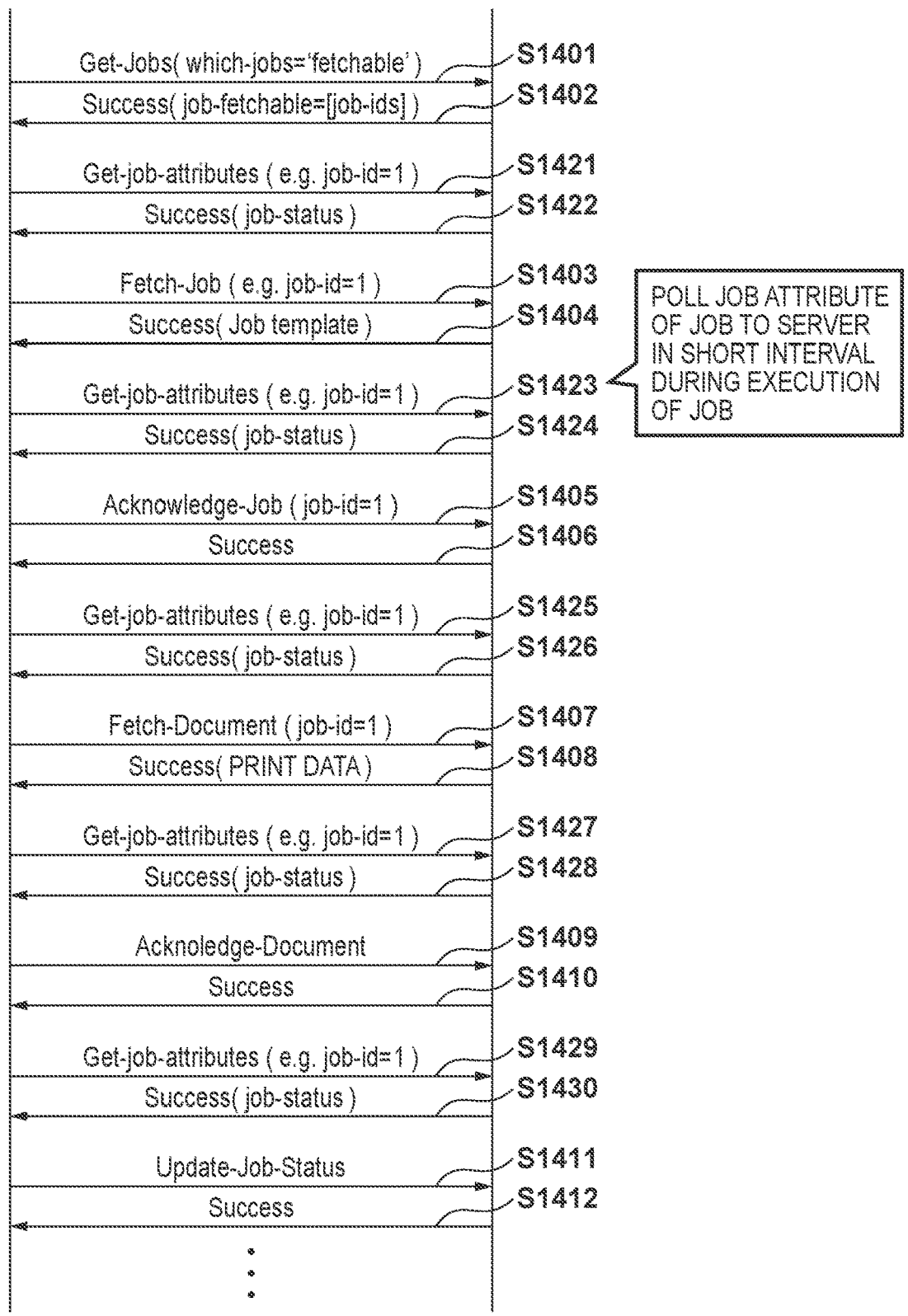

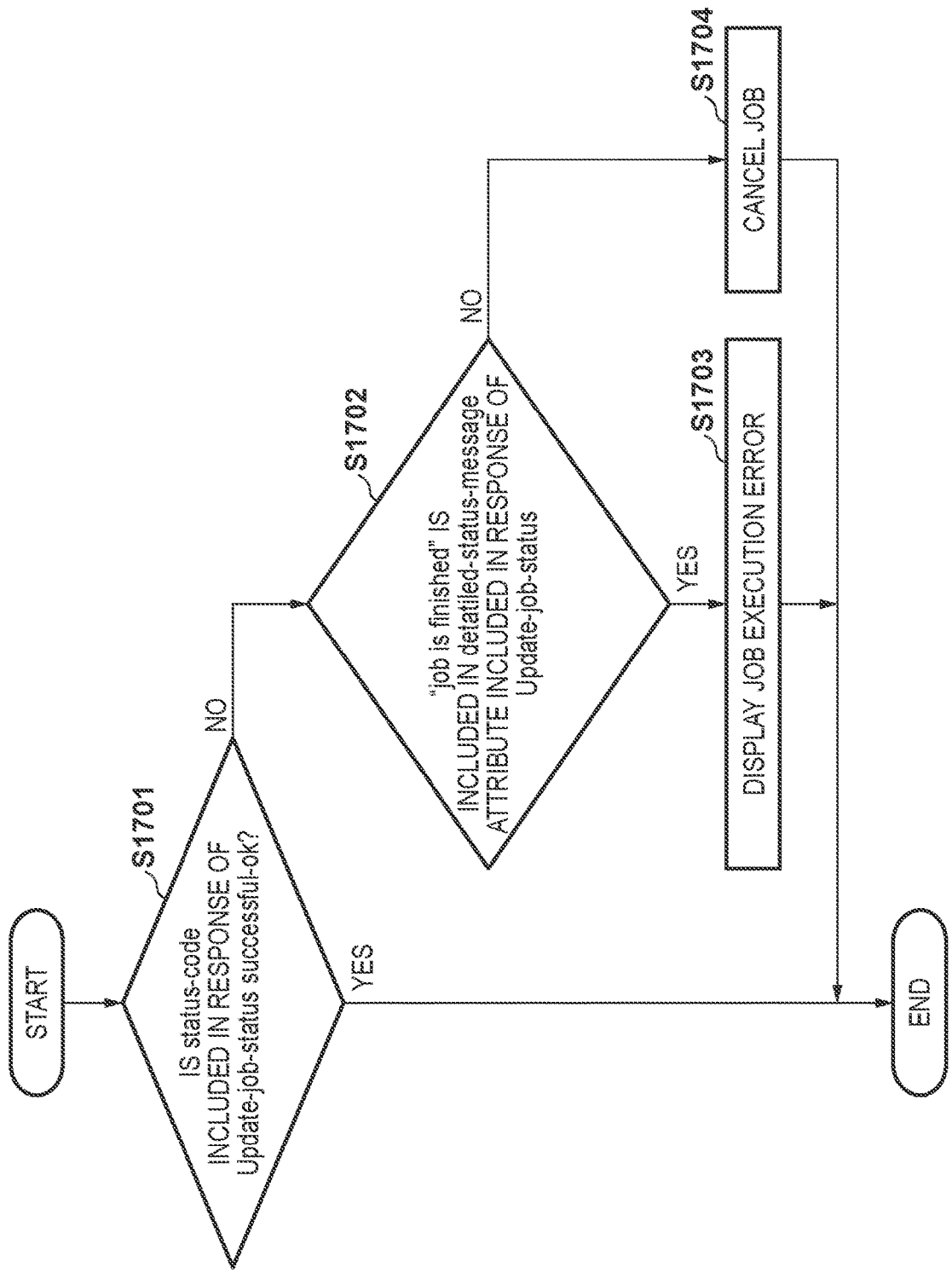

PRINTING SYSTEM INCLUDING PRINT SERVICE CANCELLATION, PRINTING APPARATUS, AND CONTROL METHOD

BACKGROUND OF THE INVENTION

Field of the Invention

The present disclosure relates to a printing system that performs printing via a server.

Description of the Related Art

In conventional print services, printing is realized by a user directly transmitting a print job from a client terminal such as a PC to a printing apparatus. Meanwhile, recently, cloud print services, which utilize a cloud service provided on the Internet, have been proposed. In the cloud print services, when a client terminal or the like transmits a print request (or a print job) to a cloud print service, a print job according to this print request is acquired by a printing apparatus registered in advance and printing is executed. The printing apparatus detects that there is a job to be printed out on the cloud print service based on an event of which the printing apparatus is notified from the cloud print service.

Here, for event notification performed by the cloud print service with respect to the printing apparatus, there are mainly two types of methods, namely, a pull method and a push method. In the pull method, when the printing apparatus transmits an event acquisition request to the cloud print service, event notification is made in response thereto. In this case, the event acquisition request is transmitted from the printing apparatus at a predetermined polling interval.

On the other hand, in the push method, once the printing apparatus establishes connection to the cloud print service and transmits an event acquisition request, the cloud print service transmits an event notification to the printing apparatus via this connection each time an event occurs.

Also, a mechanism for cancelling a job when printing is performed via a server is disclosed in Japanese Patent Laid-Open No. 2018-151981. Specifically, upon receiving an instruction to cancel a job from a user, the server of this literature transmits the cancellation instruction to a printer using a notification channel established when the printer was activated, and records the job cancellation as a print history. On the other hand, the printer cancels print processing in accordance with the cancellation instruction received from the server, and records the job cancellation as a print history.

As an aspect of the present disclosure, a mechanism is provided in which, when an instruction to cancel the execution of a print job is received from a server, it is possible to notify the server of an appropriate actual execution result of the print job based on the progress situation of the job. Furthermore, as an aspect of the present disclosure, convenience of job cancellation control is improved.

SUMMARY OF THE INVENTION

The printing system serving as one aspect of the present disclosure relates to a printing system comprising: a server configured to manage print data input from a user; and a printing apparatus configured to receive an event notification from the server, acquire a print job managed by the server based on a result of content of the event notification, and execute print processing. The server comprises: at least one memory that stores a set of instructions; and at least one processor that executes the instructions, the instructions, when executed, causing the server to perform operations comprising: transitioning, when a request for cancelling the print job managed by the server is received and an execution state of the print job for which cancellation was requested is managed as being an under-execution state, the execution state of the print job for which cancellation was requested into a temporarily stopped state; transmitting, to the printing apparatus that has acquired the print job for which cancellation was requested, information indicating that printing of the print job should be cancelled; and storing, when the execution state of the job managed by the server has transitioned to a completed state, history information that includes an execution result of the print job that has transitioned to the completed state. The printing apparatus comprises: at least one memory that stores a set of instructions; and at least one processor that executes the instructions, the instructions, when executed, causing the printing apparatus to perform operations comprising: determining, upon receiving the information indicating that printing of the print job should be cancelled from the server after the start of the print processing of the acquired print job, whether the cancellation should be accepted based on a progress situation of the processing on the print job; in a case where it is determined that the cancellation should be accepted, cancelling and terminating the execution of the print processing and notifying the server of an execution result indicating that the processing on the print job has been cancelled, and in a case where it is determined that the cancellation should not be accepted, notifying the server of an execution result indicating that output of the print job has been completed; and storing, when the execution of the print job has been completed, history information that includes the execution result of the print job. The instructions of the server further include an instruction for transitioning the execution state of the print job for which cancellation was requested into a state indicating successful completion or a state indicating termination by cancellation, based on the execution result given from the printing apparatus.

Further features of the present invention will become apparent from the following description of exemplary embodiments (with reference to the attached drawings).

BRIEF DESCRIPTION OF THE DRAWINGS

FIG. 10 is a state transition diagram illustrating management of a job state on a server 102 that provides the CPS.

FIGS. 11A and 11B are a flowchart illustrating an example of control executed by the printing apparatus 101 in the first embodiment.

FIG. 13 is a flowchart illustrating an example of control executed by the server 102 in a second embodiment.

FIG. 14 is a diagram illustrating an example of a sequence of processing for accelerating the detection of job cancellation according to a third embodiment.

FIG. 17 is a diagram illustrating an example of a flowchart of deemed job cancellation executed by the printing apparatus 101 according to a fifth embodiment.

DESCRIPTION OF THE EMBODIMENTS

Figure 1:
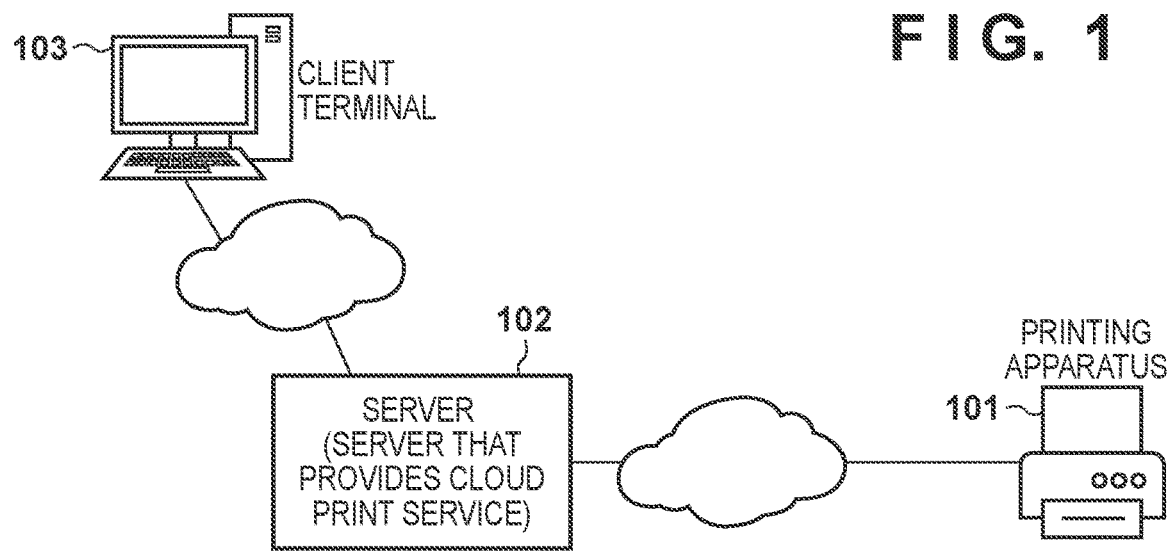
FIG. 1 is a diagram illustrating an example of a configuration of a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Event notification is also used to notify a printer of a change in the status of a print job managed on a server that provides a cloud print service. Here, if the cancellation method of the above-described literature is used to receive an event notification with the pull method, the job will be cancelled on the server side during the execution of the print job acquired from the server, and will be dealt with as being cancelled. Here, there is also a case where the execution of the job in the printing apparatus is complete, depending on the progress situation of the printing and the timing at which the event notification is received as a response to a request. Accordingly, the actual execution result of the job and the execution result stored in the server may be inconsistent with each other. Furthermore, even when a cancel event is received using the push method as in the above-described literature, there may be a case where depending on the progress situation of the printing in the printing apparatus, the print processing is completed before printing stop processing is performed. In a conventional configuration in which a priority is given to a job cancellation on the server side and the printing apparatus is notified of the cancellation, there may be a case where history information regarding the execution result (actual execution result) logged in the printing apparatus and history information regarding the execution result logged in the server differ from each other.

In light of the circumstances, the present embodiment provides a mechanism in which, even if a cancellation is made, an actual execution result can be stored in both history information regarding the execution result (actual execution result) managed by a printing apparatus, and history information regarding an execution result managed by a server. Hereinafter, a specific description thereof will be given.

First Embodiment

First, a configuration of a printing system according to the present disclosure will be described with reference to FIG. 1. The printing system according to the present embodiment includes a printing apparatus 101, a client terminal 103, and a server 102 that provides a cloud print service (hereinafter, abbreviated also as "CPS"). Also, for simplification of the description below, the cloud print service provided by the server 102 is simply referred to also as "CPS 102".

The printing apparatus 101 has a print function of printing an image on a sheet such as paper based on a print job received from an external device. Also, the printing apparatus 101 can receive a print job via the server 102 and perform printing. The client terminal 103 includes a print client that inputs a print job to the CPS 102. The terminal 103 inputs a print job to the CPS 102. The job input to the server 102 is acquired by the printing apparatus 101, and is printed by the printing apparatus 101.

Also, the printing apparatus 101 can perform, in view of security, user authentication management on the premise of user login. When a user has not logged in, the printing apparatus for which user authentication management is activated displays a login screen on an operation unit thereof, and is in a state in which any of the functions such as the copy and transmission functions provided by the printing apparatus cannot be used. Based on user authentication information (referred to also as "user credential") received by a user in the state in which the login screen is displayed, the printing apparatus 101 authenticates whether or not a user login is permitted. The printing apparatus 101 receives inputs of an ID and a password via a touch panel, for example, and acquires user authentication information. Also, the printing apparatus 101 acquires, as user authentication information, a card ID or a user ID obtained by reading an employee ID card owned by a user, or the like.

If the user login is permitted, the printing apparatus 101 displays a main screen (referred to also as "main menu") on the operation unit of the printing apparatus. The user can use the functions of the printing apparatus such as the copy and transmission functions via the main screen displayed on the operation unit. Hereinafter, in the present embodiment, an action for causing a user to log in, and transitioning the printing apparatus into a state in which the functions of the printing apparatus are available via the operation unit of the printing apparatus is referred to as "local login".

Note that in the present embodiment, as an example of the printing apparatus, an MFP (Multi Function Peripheral) is taken that has a plurality of functions that includes, in addition to the print function, a scan function of reading an original to obtain an image and transmitting the image to the outside, and so on. However, the present invention is not limited thereto. For example, the printing apparatus may be, for example, an SFP (Single Function Peripheral) that has only the print function. Although, in the present embodiment, printing on a sheet such as paper is exemplified, the present invention is not limited thereto and is also applicable to a 3D printer that forms a three-dimensional object on the basis of three-dimensional shape data.

The devices are communicably connected to each other via a network. The network may be configured by a combination of a communication network such as, for example, LAN or WAN, a public wireless communication network (such as, for example, LTE or 5G), a wireless network in compliance with IEEE802.11, and the like. That is to say, any network may be employed as long as data transmission and reception are possible, and the physical layer may employ any communication method.

Hardware Configuration of Printing Apparatus

Subsequently, a hardware configuration of the printing apparatus 101 will be described with reference to FIG. 2.

Figure 2:
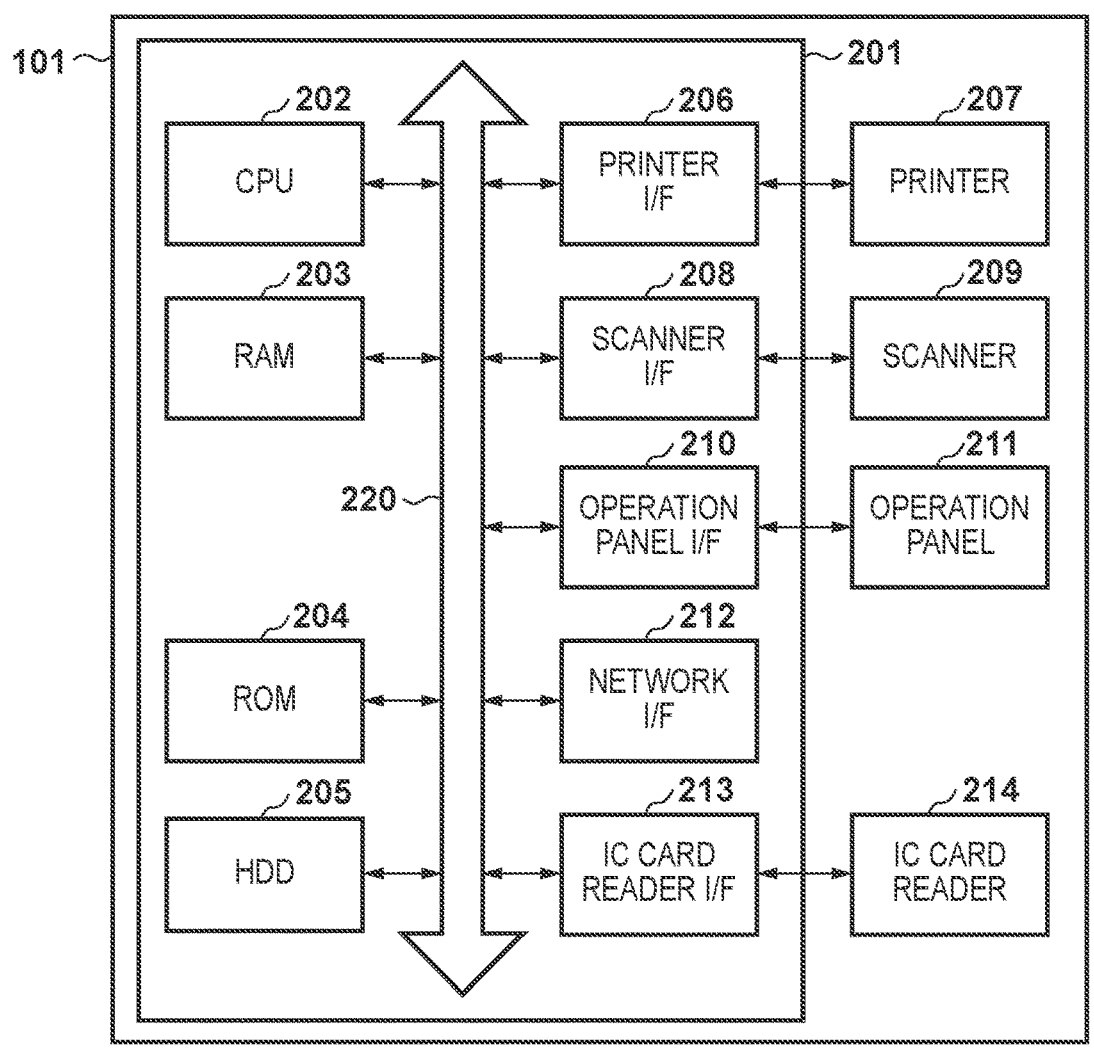
FIG. 2 is a diagram illustrating an example of a hardware configuration of a printing apparatus 101.

FIG. 2 is a block diagram showing the hardware configuration of the printing apparatus 101.

A control unit 201 including a CPU (Central Processing Unit) 202 controls overall operation of the printing apparatus 101. The CPU 202 reads a control program stored in a ROM (Read Only Memory) 204 or an HDD 205, which is a storage, and performs various types of control such as printing control and reading control. The ROM 204 stores control programs that are executable in the CPU 202. A RAM (Random Access Memory) 203 is a main storage memory for the CPU 202, and is used as a work area or a temporary storage area for expanding various types of control programs. The HDD 205 stores print data, image data, various programs, and various types of setting information. In the present embodiment, as the storage, an auxiliary storage device such as an HDD (Hard Disk Drive) is used, but a nonvolatile memory such as an SSD (Solid State Drive) may also be used instead of the HDD. In this way, the hardware such as the CPU 202, the ROM 204, and the RAM 203 constitutes a so-called computer. The computer and interfaces I/F are communicably connected to each other via an internal bus 220.

Note that in the printing apparatus 101 of the present embodiment, one CPU 202 uses one memory (RAM 203) to execute processes shown in the later-described flowchart, but the printing apparatus 101 may have another aspect. For example, a configuration is also possible in which a plurality of processors, RAMs, ROMs and storages are cooperated with each other to execute the processes shown in the later-described flowchart. Also, a hardware circuit such as an ASIC (Application Specific Integrated Circuit) or a FPGA (Field-Programmable Gate Array) may be used to execute some of the processes.

A scanner interface (I/F) 208 connects a scanner 209 and the control unit 201. The scanner 209 scans an original and generates a scanned image. Note that it is assumed that the generated scanned image is stored in the HDD 205 or the RAM 203. The scanned image generated by the scanner 209 is transmitted to a communication device, or is used for printing of the image onto a sheet, for example.

A printer I/F 206 connects a printer 207 and the control unit 201. A print image generated based on a print job acquired from a client terminal or the server 102 is forwarded from the control unit 201 to the printer 207 via the printer I/F 206. The printer 207 receives a control command and the print image via the control unit 201, and prints the image based on the print image onto a sheet fed from a paper cassette (not shown). Note that the printing method of the printer 206 may be an electrophotographic method or an inkjet method. Also, another method such as a thermal transfer method may also be applicable.

An operation panel I/F 210 connects an operation panel 211 and the control unit 201. The operation panel 211 includes a liquid crystal display unit having a touch panel function and various types of hard keys. The operation panel 211 functions as a display unit that displays information to a user and as an accepting unit that accepts an instruction from a user.

Also, the control unit 201 is connected to a network such as a LAN or a WAN via the network I/F 212. The network I/F 212 transmits information to the client terminal 103 or a CPS provided by the server 102 on the Internet, and receives a print job and information from the client terminal 103 or the CPS on the Internet.

The IC card reader I/F 213 connects the control unit 201 and an IC card reader 214. The IC card reader 214 uses a contactless wireless system such as Felica (registered trademark) to acquire, from an IC card such as an employee ID card, a card ID or a user ID for specifying the owner, for example. The ID acquired via the IC card reader 214 is used as user authentication information for the above-described login function.

The server 102 that provides a cloud print service and the client terminal 103 have a configuration of a general-purpose computer that includes a processor, a memory, a communication function, a user interface, and the like. This configuration is the same as the configuration of the above-described printing apparatus except for hardware such as the printer 207, the scanner 209, and the IC card reader 214, and the interfaces (I/F) for communicating with the hardware, and thus a description thereof is omitted. Note that the server 102 that provides a CPS can use a plurality of processors, RAMs, ROMs, storages, and a plurality of computer resources to execute the processes shown in the later-described flowchart.

Software Configuration of Printing Apparatus 101

Figure 3:
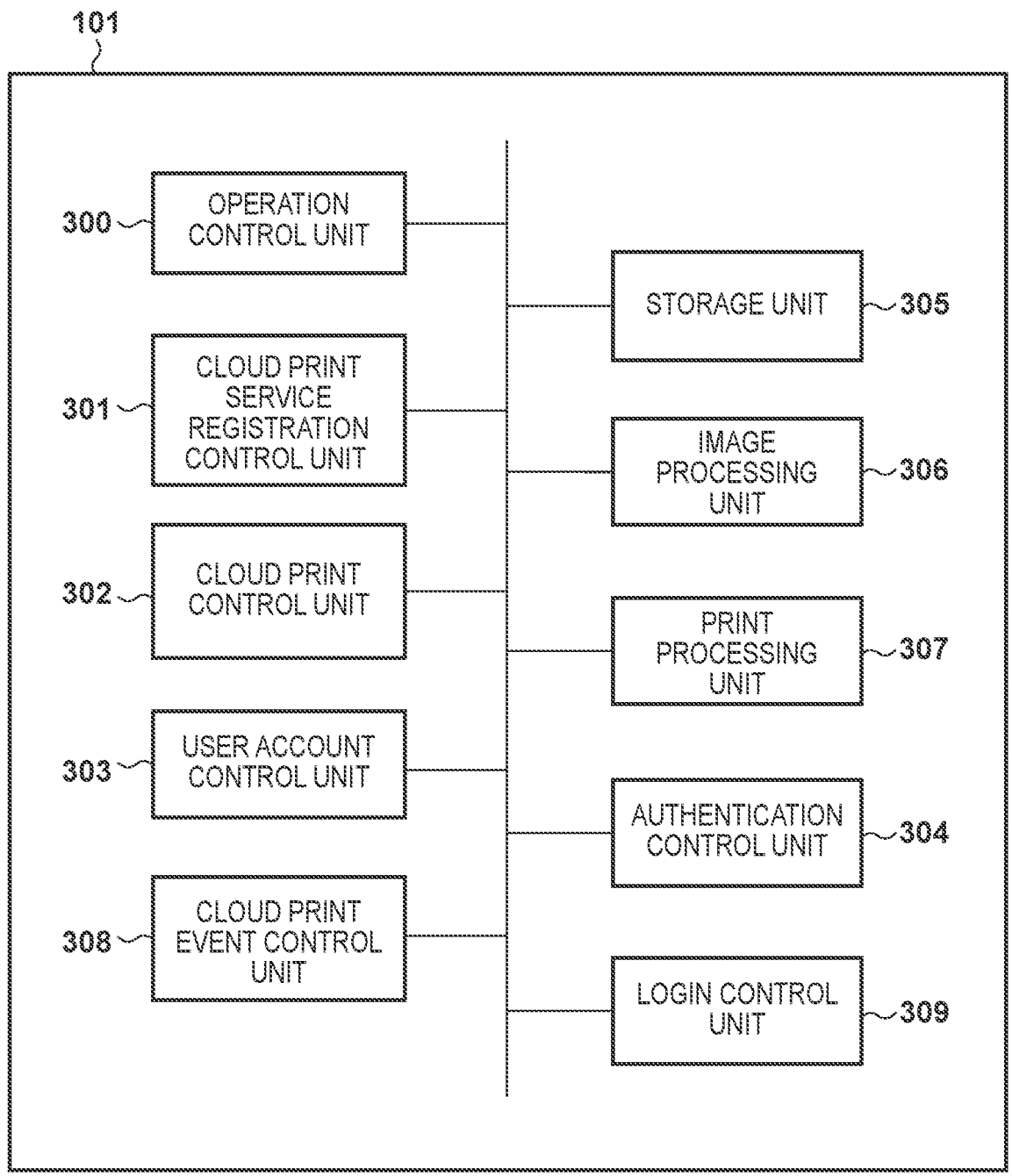
FIG. 3 is a diagram illustrating an example of a software configuration of the printing apparatus 101.

FIG. 3 is a diagram illustrating a software configuration of the printing apparatus 101. Note that the control programs that correspond to the functional units are stored in the HDD 205 shown in FIG. 2, are loaded by the CPU 202 onto the RAM 203, and are executed.

An operation control unit 300 controls the operation panel 211. Examples of the control include displaying a screen on the operation panel 211, waiting for an instruction input from a user, and notifying another functional unit of the accepted instruction content. Also, the operation control unit 300 performs update of the display screen on the basis of instruction content, and displays the updated screen on the operation panel 211.

A cloud print service registration control unit 301 analyzes a cloud print service registration request received from the client terminal 103, and registers the printing apparatus 101 in the CPS 102 or manages the registration information.

A cloud print control unit 302 receives the print data (print job) received from the CPS 102 via the network I/F 212. The received print job is managed by the control unit 302. The received print job is first input to a queue in a print waiting state. Subsequently, if it is determined that the printer 207, which is a resource for printing, is in a printable state, the control unit 302 transitions the job input to the queue into an "under printing" state. Subsequently, the print data that corresponds to the print job and print settings required for rendering are transmitted to an image processing unit 306. The image processing unit 306 executes processing for rendering the print data into image data based on the print data and the print settings. An ASIC can be used for part of the image conversion processing. A print processing unit 307 controls the printer 207 based on the image data rendered by the image processing unit 306 and the settings contained in the job. Specifically, an image signal (print image) and a control signal are transmitted to the printer 207 via the printer I/F 206. The printer 207 prints the image onto a sheet based on the image signal and the control signal.

A cloud print event control unit 308 controls event transmission and event reception processing between the printing apparatus 101 and the CPS 102.

A storage unit 305 is a database that stores setting information of the printing apparatus, and user management information for use in login authentication. A user account control unit 303 manages user account information stored in the storage unit 305. The control unit 303 provides functions of adding, deleting, and editing a user, and the like. The storage unit 305 also manages history information that includes an execution result of the print job.

An authentication control unit 304 authenticates whether or not the user is authorized to use the printing apparatus 101, using the user account information managed by the user account control unit 303 and authentication information accepted from a user.

A login control unit 309 cooperates with the authentication control unit 304 and the operation control unit 300 to provide the above-described login authentication function. The login control unit 309 manages a log-in state of a user with respect to the printing apparatus 101. When local login of a user has not occurred in the printing apparatus (that is, in a log-out state), the login control unit 309 cooperates with the operation control unit 300 to display a login screen on the panel 211. Also, the control unit 309 receives, in a state in which the login screen is displayed, user authentication information via the screen or the IC card reader 214. Subsequently, the control unit 309 transmits an authentication request that includes the received user authentication information to the authentication control unit 304. Upon receiving a response indicating that the user authentication was successful from the authentication control unit 304, the control unit 309 acquires information of the user from the authentication control unit 304 or user account control unit 303, and causes the user to log in the printing apparatus. The information of the logged-in user that is managed by the control unit 309 is suitably referenced from the software modules. For example, the operation control unit 300 references the information to display a screen (e.g., a later-described job history screen) that is personalized according to the user.

Print Processing Using CPS

Figure 4:
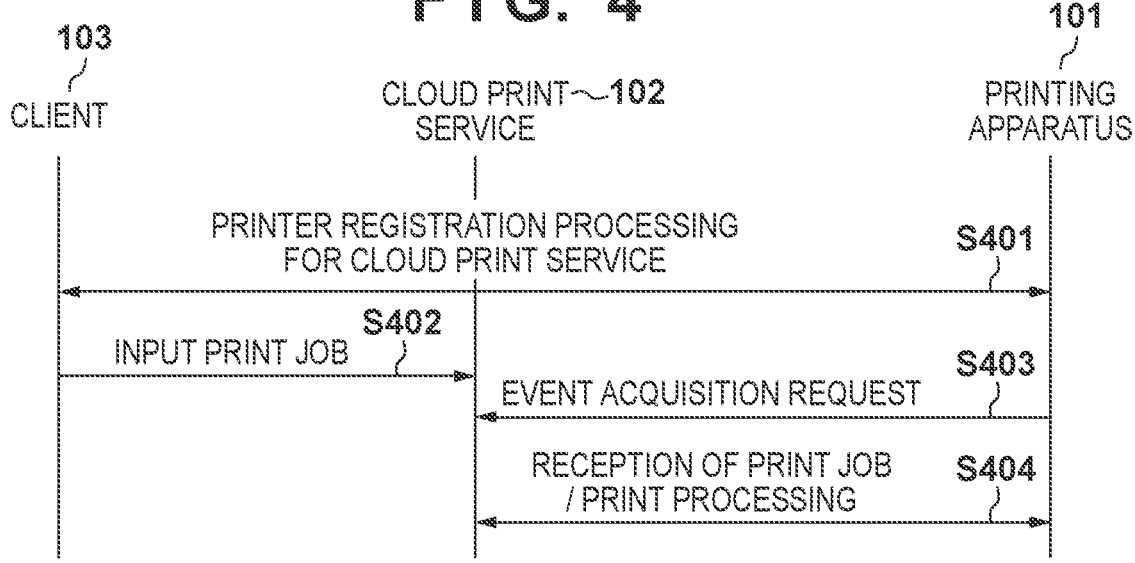
FIG. 4 is a diagram illustrating an example of a sequence of registration into a cloud print service (CPS).

Subsequently, print processing using the CPS 102 will be described with reference to FIG. 4. FIG. 4 shows an example of a sequence in which a printer is registered in the CPS 102 and is used. Note that in processes of the sequence described hereinafter, the sentences starting with "the printing apparatus 101" means processing realized by the CPU 202 of the printing apparatus executing a program that corresponds to the control module shown in FIG. 3 or a control module that is not shown. Also, the sentences starting with the "CPS 102" means processing realized by a processor of the server 102 that provides the CPS 102 executing the program. Note that it is assumed that part of processing represented by the print processing, communication transmission and reception processing, and display processing is realized by the CPU 202 and the hardware units described in FIG. 2 cooperating with each other.

In step S401 (sequence 401), the printing apparatus 101, the CPS 102, and the client terminal 103 cooperate with each other to perform processing for registering the printing apparatus 101 into the CPS 102. A user uses the client terminal 103 to browse a setting screen for cloud printing via a Web UI provided by the printing apparatus 101. Upon detecting a registration request made via this screen, the printing apparatus 101 transmits a registration request to the cloud print service. The CPS 102 that has received the registration request registers the printing apparatus 101 as a printer that is usable for a first type of cloud print service. With this registration processing, the account for a cloud print service that is owned by the user who is the administrator or the like, and the printer ID are associated with each other. Also, processing for issuing an access token and an access destination URL needed for acquiring a job from the printer, and the like are performed. Information that is issued in the registration processing and is needed for communication with and the reception of a job from the CPS 102 is stored in the storage unit 305.

Upon completion of the registration of the printing apparatus 101 into the CPS 102, it is possible to perform printing, via the CPS 102, from the client terminal in which the print client corresponding to the CPS 102 is installed.

Subsequently, printing control will be described with reference to steps S402 onward. In step S402, the client terminal 103 generates a print job in response to a user operation to instruct printing using the cloud printer registered in the CPS 102. Subsequently, the generated print job is input to the CPS 102. The print job that is input to the CPS 102 includes print data, print settings (print attributes), and information for identifying the user and the tenant. The CPS 102 that has received the print job saves the print job in a job DB of the server 102. Note that the destination to which the job is saved may be, instead of the server 102, a cloud storage such as an S3.

Subsequently, in step S403, the printing apparatus 101 periodically inquires of the CPS 102 about event occurrence, namely, whether or not a new event has occurred. If, as a result of the inquiry, a job event notification indicating that there is a new print job is received, acquisition of the print job from the CPS 102 and print processing are performed in accordance with the job event notification (step S404).

Subsequently, the event inquiry processing and the print processing described with respect to steps S403 and S404 will be described with reference to FIGS. 5 and 6.

As described above, event notification of a print job includes two types of methods, namely, a pull method and a push method, and the present embodiment describes a case where the pull method is used as an example.

Figure 5:
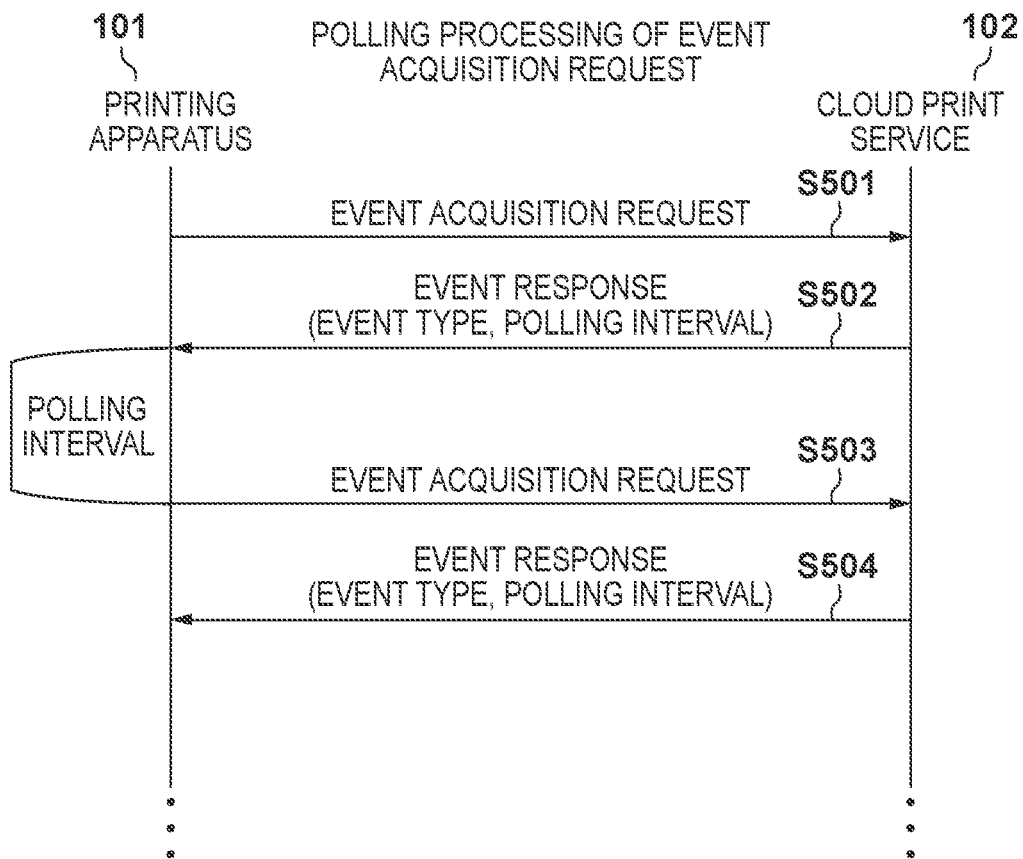
FIG. 5 is a diagram illustrating an example of a sequence of receiving an event notification with a pull method.

FIG. 5 is a diagram illustrating an example of a processing sequence of event notification (pull method). The printing apparatus 101 transmits, to the CPS 102, an event acquisition request that includes information for specifying a printer (such as a cloud printer ID) and information needed for authentication such as an access token (step S501).

Upon receiving the acquisition request transmitted in step S501, the CPS 102 transmits, to the printing apparatus 101, an event response including information indicating an event type and a polling interval (step S502). The CPS 102 stores, as the information indicating an event type, information indicating an event that has occurred in the CPS 102 and of which the printer is to be notified. Specifically, a job reception event is conceivable that indicates that a print job printable in the printing apparatus 101 has been input to the CPS 102. Also, a job cancel event is conceivable that indicates that cancellation of a print job received by the printing apparatus 101 has been requested. The job cancel event includes specifying information (e.g., a job ID) for specifying a job to be cancelled.

If no event has occurred, information indicating that there is no event, and a polling interval are set for the event response in step S502. Note that the information indicating that there is no event may also be omitted. The polling interval included in the event request is information for instructing the printing apparatus 101 about the next inquiry interval. For example, the CPS 102 gives an instruction about the interval from 30 seconds to 1 minute, for example. The printing apparatus 101 that has received the response in step S502 changes the settings of the polling interval, if there is a change in the polling interval designated from the server.

Subsequently, the printing apparatus 101 determines, based on the settings of the polling interval, whether or not time that corresponds to the polling interval has elapsed from the previous inquiry. If it is determined that the time has elapsed, the printing apparatus 101 transmits again an event acquisition request to the CPS 102 (step S503). The CPS 102 that has received this request transmits an event response. The above-described request and response are executed in repetition with the set polling interval. The CPS 102 uses the responses of the communication executed repeatedly to notify the printing apparatus 101 of events occurred in the CPS 102.

Subsequently, a sequence of job reception will be described with reference to FIG. 6. FIG. 6 is a sequence diagram showing an example of processing executed when the printing apparatus 101 has received a job reception event, with the event notification mechanism described with reference to FIGS. 4 and 5.

Note that the present embodiment describes, as an example, a case where an Internet Printing Protocol (IPP) is employed as a print protocol between the printing apparatus 101 and the cloud print service 102.

The printing apparatus 101 that has received the job reception event transmits a Get-Jobs request to the cloud print service 102 (step S601). The printing apparatus 101 sets 'fetchable' for a "which-jobs attribute" of the request. This attribute refers to information indicating that it is a request for inquiring whether or not there is a receivable print job.

The CPS 102 that has received the Get-Jobs request in step S601 determines whether or not the printing apparatus 101 manages a receivable print job. If it is determined that the printing apparatus 101 manages a receivable print job, the CPS 102 transmits, to the printing apparatus 101, a Success response in which a job-id is set for a job-fetchable attribute (step S602). The job-id is information for specifying a job to be acquired and printed out by the printing apparatus.

The printing apparatus 101 that has received the response transmitted in step S602 transmits a Fetch-Job request to the CPS 102 (step S603). The printing apparatus 101 receives print settings (bibliographic information) of the job as a response to the Fetch-Job request. At this time, the printing apparatus 101 sets the job-id of a print job desired to be acquired from the CPS 102 for the Fetch-Job request. Hereinafter, the job-id set in step S603 is referred to also as the "job-id of the acquisition target".

The CPS 102 that has received the Fetch-Job request transmitted in step S603 transmits a Success response to the printing apparatus 101 (step S604). At this time, the print settings of the print job are set for a job-template attribute.

Subsequently, the printing apparatus 101 that has received the Success response including the print settings determines whether or not the format of the print settings is correct. If the format of the print settings is correct, the print control unit 302 of the printing apparatus 101 generates a job for internally managing the print processing. The received print settings are set for the job.

The printing apparatus 101 that has received the response transmitted in step S604 transmits an Acknowledge-Job request to the cloud print service 102 (step S605). At this time, the job-id of the acquisition target is set for a job-id attribute. This request is a request for notifying the CPS 102 of the fact that the job has been accepted. Note that if it is determined that the format of the print settings is not correct, the printing apparatus 101 transmits information indicating an error in response to this request and stops the document receiving processing thereafter.

The CPS 102 that has received the Acknowledge-Job request transmits a Success response to the printing apparatus 101 (step S606).

Then, the printing apparatus 101 transmits a Fetch-Document request to the CPS 102 (step S607). Here, the job-id of the acquisition target is set for the job-id attribute. This request is a request for print data.

The cloud print service 102 that has received the request transmitted in step S607 transmits a Success response and print data to the printing apparatus 101 (step S608). Thereafter, the print data that corresponds to the job-id of the acquisition target is transmitted to the printing apparatus 101 from the CPS 102.

The printing apparatus 101 that could normally receive the print data transmitted in step S608 transmits an Acknowledge-Document request to the CPS 102 (step S609). Note that if any error occurs in the reception, the printing apparatus 101 sets information indicating the error for the request, and stops the print processing thereafter.

Subsequently, the CPS 102 that has received the Acknowledge-Document request transmitted in step S609 transmits a Success response to the printing apparatus 101 (step S610).

The print control unit 302 of the printing apparatus 101 that has received the print data corresponding to the job-id of the acquisition target associates the generated job with the print data. This job is input to a print queue, and is printed sequentially in accordance with the order of input into the queue. The print processing is realized as a result of the control unit 302, the processing units 306 and 307, and the printer 207 cooperating with each other.

Subsequently, the printing apparatus 101 transmits the processing state of the job to the CPS 102, using an Update-Job-Status request (step S611). This request is a request for notifying the CPS 102 of the execution state of the job (such as, for example, a job status (such as whether a print-waiting status or print-executing status) or a progress situation as to for how many pages printing is complete).

The CPS 102 that has received the Update-Job-Status request transmitted in step S611 transmits a Success response to the printing apparatus 101 (step S612).

Thereafter, the print processing will progress while repeatedly transmitting and receiving Update-Job-Statuses. When the print processing is normally completed, the printing apparatus 101 notifies the CPS 102 of the completion of the execution of the job, using an Update-Job-Status. Furthermore, the printing apparatus 101 saves history information in which information indicating successful completion as an execution result, and bibliographic information of the job (e.g., the number of pages, the number of copies, the execution time, the document name (file name), and the name of the user who made the input) are associated with each other. With the processing described with reference to FIGS. 4 to 6, printing of the pull method is possible.

Description of Problems

Figure 7:
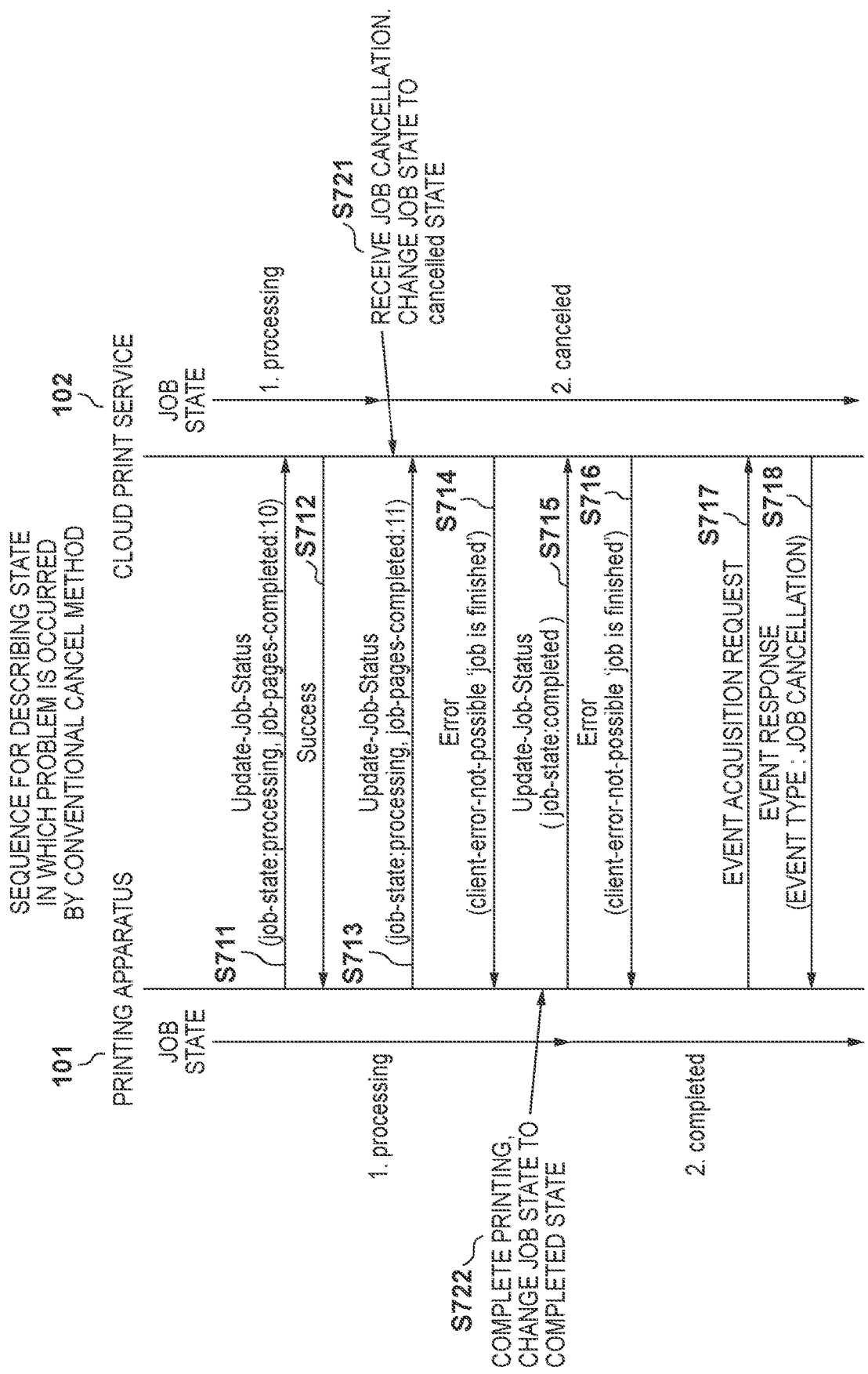
FIG. 7 is a diagram illustrating an example of a problem caused when a conventionally known cancellation technique and the pull method are combined with each other.

The following will describe problems that may occur when an operation for cancelling a job from the CPS 102 or the print client of the client terminal 103 with reference to FIG. 7.

FIG. 7 is a sequence diagram for illustrating an example of a problem that occurs when a conventionally known cancellation technique as described in Japanese Patent Laid-Open No. 2018-151981 and a technique for accepting a job cancel event using the pull method are combined with each other. The sequence of FIG. 7 indicates processing when, after the start of the job execution in FIG. 6, a notification of a job cancel event is given from the CPS side.

Here, a case is exemplified in which a print target job having 11 pages in total is to be printed, and a job cancellation instruction is given to the CPS 102 after the completion of printing of the tenth page. Also, FIG. 7 shows job states, namely, the states of the print jobs managed by the respective devices, and the state transitions thereof.

First, the printing apparatus 101 gives, using an Update-Job-Status request, a notification of a job status indicating that a job is under execution and printing is complete until the tenth page (step S711). Specifically, a request is transmitted that includes "job-state: processing, job-pages-completed: 10" shown in step S711. This means that the job is under print processing, and the output of the tenth page is complete. The CPS 102 that has received this request transmits a Success response (step S712). Based on this notification, the CPS 102 maintains the job state for managing the print state on the cloud as "processing", which means that the job is under processing.

Subsequently, in step S721, the CPS 102 detects that a job cancellation request has been accepted from the print client of the client terminal or the Web UI provided by the CPS 102 to the client terminal. Then, at a timing at which the request is accepted, the state of the job on the server transitions to a "cancelled" state. Here, in the IPP, the job that has transitioned to the "cancelled" state is dealt with as a job that has been already executed. However, if the pull method is employed, a notification of a job cancel event will be given at a predetermined polling interval (such as 30 seconds or 1 minute as described above). Accordingly, there are cases where the notification of cancellation is not given at this timing.

Accordingly, the job progresses in a state under normal execution in the printing apparatus 101. When printing of the eleventh page, which is the next page, is complete, the printing apparatus 101 notifies the CPS 102 of the job status indicating that the printing of the eleventh page is complete (step S713).

The CPS 102 that has received the request transmitted in step S713 tries to update the state of the job designated by the Update-Job-Status request. However, the job has already reached the final state due to the cancellation processing described with reference to step S721.

Therefore, an Error response is transmitted to the printing apparatus 101, the Error response including a character string that supplementally describes the fact that update has not been performed and the reason thereof (step S714). The error is an error indicating that the job status request has failed, and thus the printing apparatus 101 will continue to perform print processing of the print job at this point in time. Accordingly, upon completion of printing of the eleventh page, the execution of the print job is normally completed on the printing apparatus 101 (step S722). As a result, the job state of the print job managed on the printing apparatus 101 is a "completed" state.

Subsequently, the printing apparatus 101 notifies, using an Update-Job-Status request, the CPS 102 of the fact that the job state has transitioned from the under-execution state to the normally completed state. Specifically, a request is transmitted that includes an attribute such as "job-state: completed". This attribute indicates that the job is complete.

The CPS 102 that has received the request fails to update the job state since the job state on the cloud is already the "cancelled state", which is the final state. As a result, the CPS 102 transmits again an Error response to the printing apparatus 101 (step S716).

Also, the printing apparatus 101 executes, in parallel to the job execution processing, processing for determining whether or not time that corresponds to the polling interval has elapsed from the previous inquiry. If it is determined that the time has elapsed, the printing apparatus 101 transmits the event acquisition request described with reference to FIG. 5 to the CPS 102 (step S717). The CPS 102 that has received the acquisition request transmitted in step S717 transmits, to the printing apparatus 101, an event notification that includes information indicating the event type for cancelling the job (step S718). However, since the execution of the job is complete at this timing, the job state or the job history cannot be changed. Also, even if the job history is changed, updating the job actually normally completed to cancellation is inconsistent with reality, and thus is not desirable.

Accordingly, depending on the printing progress situation and the timing at which an event notification is received as a response to a request, there may be cases where the execution of a job in the printing apparatus is completed. In this case, there are cases where inconsistency occurs between the actual execution result of the job, and the execution result stored in the server. Note that also when notification is made with the push method, there may be a case where depending on the printing progress situation in the printing apparatus, print processing is completed before printing stop processing is performed. That is, in the conventional configuration in which priority is given to the job cancellation on the server side and the printing apparatus is notified of cancellation, there is the problem that the history information logged in the printing apparatus (actual execution result) and the history information logged in the CPS 102 are different from each other.

In view of at least one of these problems, the present embodiment provides a function that, at a timing at which a cancellation request is issued, the job on the cloud is not promptly cancelled but is regarded as being in a stopped state. Furthermore, a mechanism is provided in which, upon receiving an instruction to cancel the execution of a print job from the CPS 102, the CPS 102 can be notified of the appropriate actual execution result of the print job based on the progress situation of the job, and the actual execution history of the job can be appropriately updated.

Figure 8:
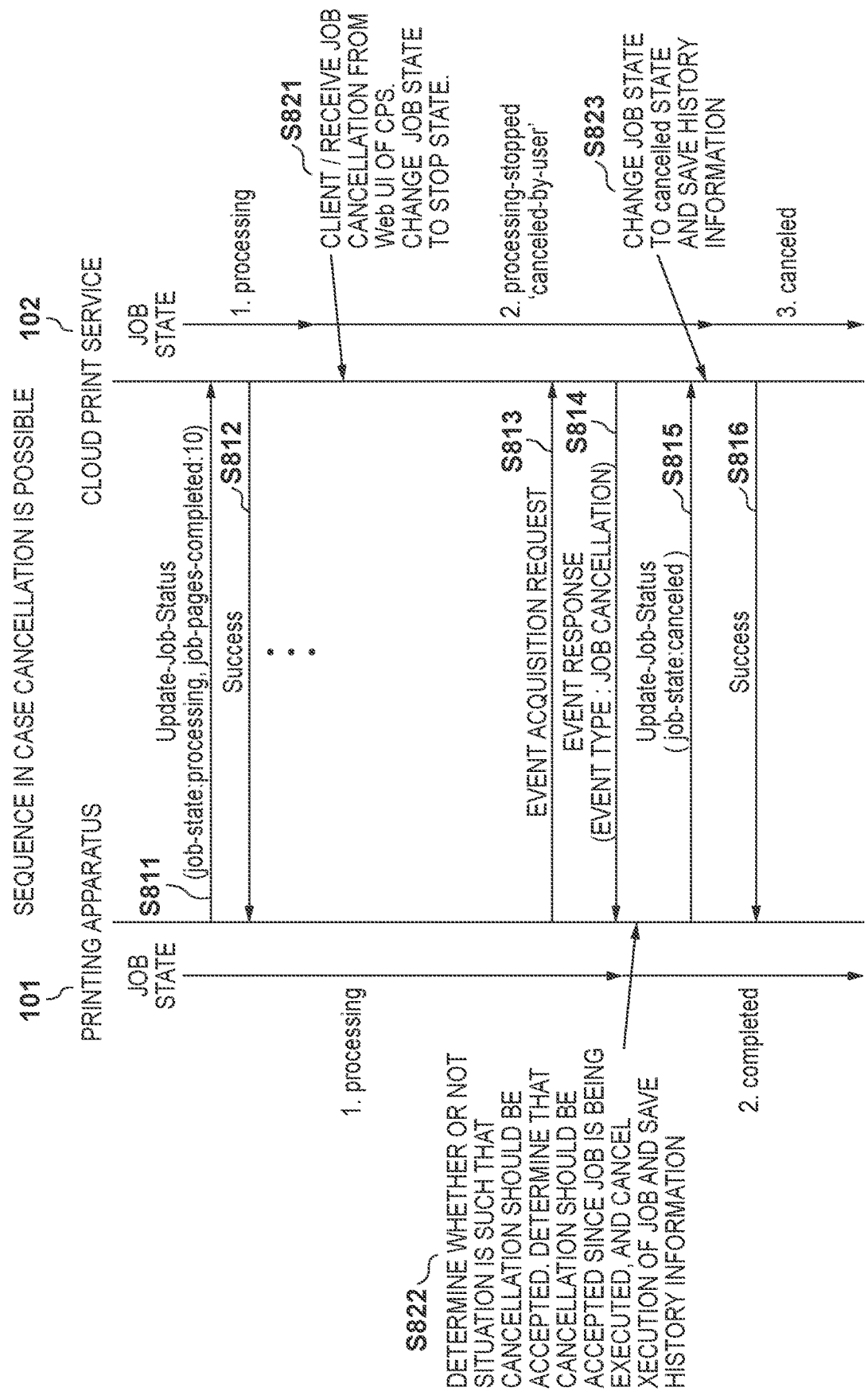
FIG. 8 is a diagram illustrating an example of a sequence of job cancellation processing according to a first embodiment.
Figure 9:
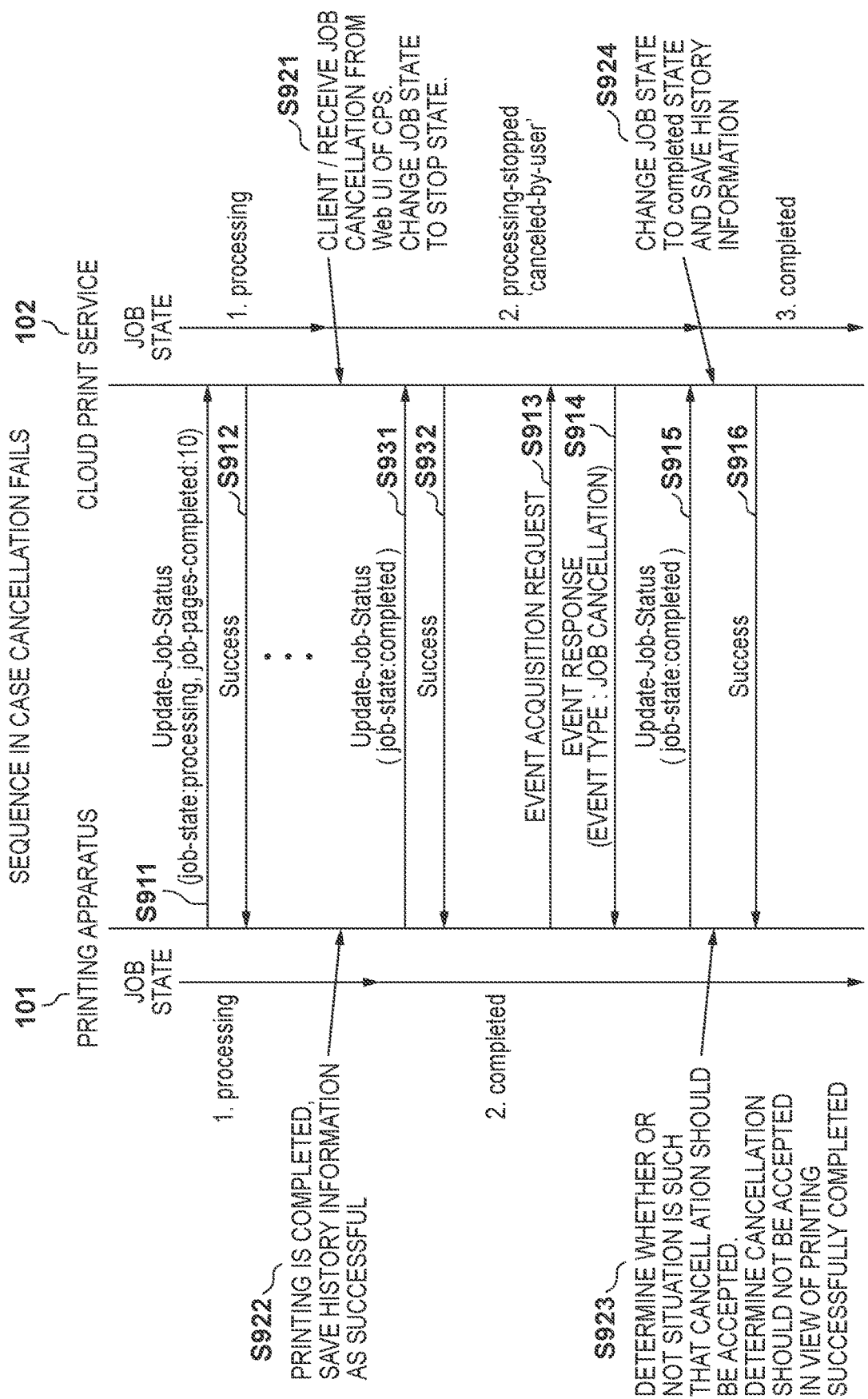
FIG. 9 is a diagram illustrating the example of the sequence of the job cancellation processing according to the first embodiment.

Hereinafter, a detailed description will be given. FIGS. 8 and 9 are diagrams illustrating an example of a sequence of job cancellation to which the present embodiment is applied.

Example of Case Where Cancellation is Successful

The following will first describe a sequence when cancellation is successful with reference to FIG. 8. Here, a case is assumed in which a print job that was acquired from the CPS and is under processing includes 50 pages, and cancellation is made in time even if an inquiry about whether or not there is an event is made after a predetermined polling interval (30 seconds or 1 minute). Steps S811 to S812 are steps for giving a request for updating the job status and a response thereto similar to the steps S711 to 712 in FIG. 7. Also, a description will be given assuming that a job cancellation request is given by a user operation at the same timing as that described with reference to FIG. 7.

Upon accepting the job cancellation operation, the CPS 102 transitions to a temporarily stopped state (step S821). Accordingly, the execution state of the job (job state) managed on the cloud print service 102 transitions to a "processing-stopped" state, which means temporary stop of the job in terms of the IPP standard. Also, the CPS 102 sets "canceled-by-user" for "job-state-reasons", which is information indicating the reason for the transition to the job state.

When printing of the next page (eleventh page) is complete, the printing apparatus 101 transmits a request indicating that the printing of the eleventh page is complete. The CPS 102 updates the progress situation of the job in the stopped state, and transmits a Success response as a response to this request. Thereafter, the print processing and update of the job status in the printing apparatus 101 are executed normally until an event acquisition with polling occurs.

Then, if it is determined that the time corresponding to the polling interval has elapsed from the previous inquiry, the printing apparatus 101 transmits the event acquisition request described in FIG. 5 to the CPS 102 (step S813). Here, the CPS 102 performs job management while regarding the state of the print job under execution as the temporarily stopped state and a job state in which the job is temporarily stopped due to a user cancellation. In view of this job state, the CPS 102 transmits, to the printing apparatus 101, an event for requesting cancellation of the job (step S814).

The printing apparatus 101 that has received the event notification indicating cancellation that was transmitted in step S814 determines whether or not the situation is such that the cancellation should be accepted. Here, since the job is in the state under normal execution, it is determined that the cancellation should be accepted, and the execution of the job is cancelled. Furthermore, the printing apparatus 101 stores, in the storage unit 305, the history information in which the execution result indicating that the execution of the job has failed, and the bibliographic information of the job are associated with each other (step S822). This history is used for display of the job execution history, or is transmitted to an information management server of a client.

Subsequently, the printing apparatus 101 notifies, using an Update-Job-Status request, the CPU 202 of the job status indicating that the job has been cancelled (step S815). It is assumed that this job status includes a status indicating, for example, how many pages have been printed before the cancellation is reached.

The CPS 102 that has received this request transitions the job state managed on the cloud into the "cancelled" state. Subsequently, the CPS 102 stores the history information of the job that has reached this final state (step S823). In this case, the history information in which the execution result indicating that the execution of the job was failed, and the bibliographic information of the job are associated with each other is stored in the storage area of the CPS 102. For the bibliographic information, the number of pages printed until cancellation is reached, the cancelation reasons, and the like are set. Ultimately, the CPS 102 gives, to the printing apparatus 101, a response indicating that the update of the job state was successful (step S816).

With this procedure, it is possible to correctly update the number of pages of a printed matter actually output until cancellation.

Example of Case Where Cancellation Fails

The following will describe an example of a case where cancellation fails with reference to FIG. 9. In FIG. 9, a case is assumed in which a print job includes 11 pages in total, and printing is completed before a cancellation notification is accepted.

The update of the job status in steps S911 to S912 is the same as that in steps S711 to S712 in FIG. 7. Also, control in step S921 where the CPS 102 changes the job state to the temporarily stopped state, and the flow of the processing such as print processing also continues thereafter are the same as those in FIG. 8, and descriptions thereof are omitted.

Upon completion of the printing of the eleventh page, the printing apparatus 101 transitions the state of the print job under execution that is managed by itself into the completed state (step S922). Then, the printing apparatus 101 gives a request for changing the job state to successful completion to the CPS 102 (step S931). The CPS 102 that has received this notification responds with a Success response (step S932). On the other hand, the CPS 102 temporarily stops the job in a cancellation waiting state, and did not receive a result of the cancellation request. Accordingly, the CPS 102 keeps the state of the job in the temporarily stopped state.

Thereafter, in the processing in steps S913 to S914, the same event indicating a cancellation request as that in steps S813 to S814 is transmitted. The printing apparatus 101 that has received the event indicating the cancellation request determines whether or not the situation is such that the cancellation should be accepted. Here, the printing apparatus 101 determines that the cancellation request should not be accepted in view of the fact that the printing was successfully completed (step S923). Subsequently, the printing apparatus 101 notifies the CPS 102 of the job status indicating that the job was successfully completed (step S915). For this status, information indicating that the cancellation request was received but the printing was successfully completed is set. This information is an example, and any information may be used as long as the CPS 102 can be notified of the fact that the cancellation request was not in time.

The CPS 102 that has received the job status update request transmitted in step S915 transitions the job state into the "completed" state. Subsequently, history information in which the execution result of the job and the bibliographic information thereof are associated with each other is saved (step S924). It is assumed that this history includes information indicating that cancellation has not been made in time. Ultimately, the CPS 102 transmits, to the transmits printing apparatus 101, a response indicating that the update was successful (step S916).

Note that in the present embodiment, a case is assumed in which, in the processing sequence in step S932, a response indicating a success is given and the job state is kept as the temporarily stopped state. However, control as will be described below is also conceivable. The CPS 102 may change, upon receiving a notification transmitted in step S931 indicating that the job is complete, the job state to "completed". In this case, the CPS 102 discards a request that is to be transmitted as a next event notification and includes the type event of job cancellation. Also, if the job temporarily stopped due to a cancellation request given from a user satisfies a condition such as a condition that it has been transitioned to the "completed" state, which means successful completion, the CPS 102 will store this fact as history information. For example, information indicating that cancellation has not been made in time will be set for the history information of the job.

FIG. 10 is an exemplified state transition diagram illustrating the execution state of a job managed by the CPS 102 and the transition thereof. A state S1 shows an "under execution" state. Upon receiving a job cancellation request from the Web UI provided by the CPS or a client when the job management state is S1, the CPS 102 transitions the corresponding job management state into a state S2. The state S2 shows the above-described temporarily stopped state. Also, in the management state of S1, upon receiving a notification indicating that the job is completed, the CPS 102 transitions the corresponding job management state into a state S4. The state S4 shows the above-described normally completed state. Ultimately, in the job management state of S2, upon receiving a request for updating the status to cancelation from the printing apparatus, the CPS 102 transitions the state into a canceled state S3, and upon receiving a request for updating the status to successful completion, the CPS 102 transitions the state into the state S4.

Figure 11B:
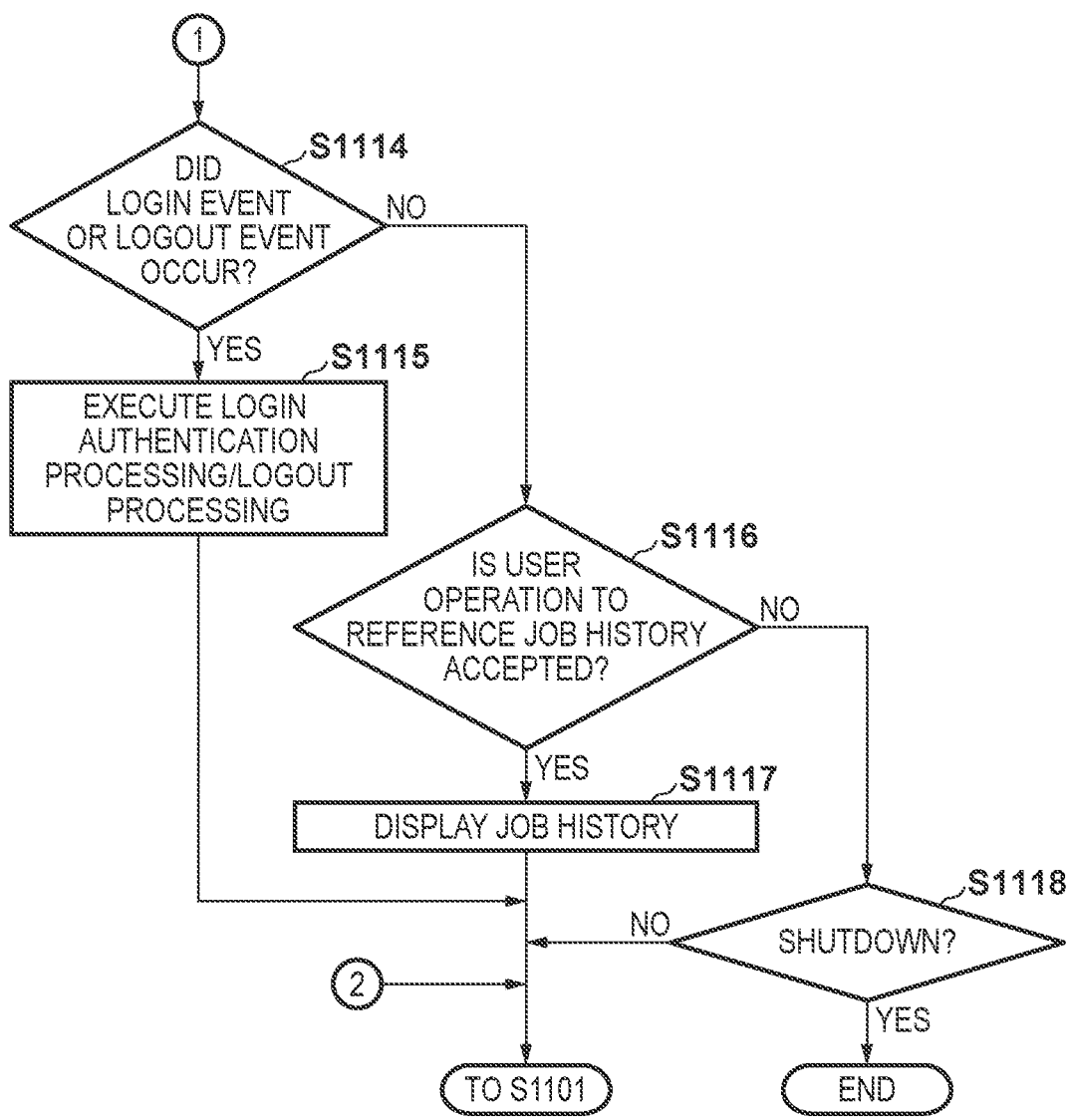

Hereinafter, specific control executed by the printing apparatus 101 will be described with reference to the flowchart shown in FIGS. 11A and 11B. The operations (steps) shown in the flowchart in FIGS. 11A and 11B are realized by the CPU 202 reading programs for realizing control modules stored in the ROM 204 or the HDD 205 onto the RAM 203 and executing them. Note that in cases where the control modules, which are main components for causing the operations, are clearly described, the operations are described as being executed by the control modules named in the example in FIG. 3.

In step S1101, if it is determined that time corresponding to a polling interval has elapsed from the previous inquiry and the timing of event inquiry is reached, the CPU 202 moves to the processing in step S1102. On the other hand, if it is determined that the timing of event inquiry is not reached, the CPU 202 moves to the processing in step S1114.

First, event acquisition using polling will be described. In step S1102, the CPU 202 transmits an event acquisition request to the server 102 (CPS 102). Then, the CPU 202 receives an event notification as a response to the acquisition request. Subsequently, the CPU 202 determines, in step S1103, whether or not the event notification is a job reception event. The CPU 202 moves to the processing in step S1104 if the event notification is a job reception event, whereas moves to the processing in step S1106 if the event notification is not a job reception event.

In step S1104, the CPU 202 cooperates with the network I/F 212 and the printer 207 to execute receiving processing and print processing of a print job with the job reception event serving as a trigger. It is assumed that the receiving processing of the job is executed in accordance with the communication sequence described in FIG. 6. Upon receiving the job, the print control unit 302 generates a job for internally managing the print state, and manages the progress of the printing. Note that it is assumed that the execution of the print job and state management of the job state described in step S1104 are executed in parallel to the processes described in this flowchart.

In step S1105, the CPU 202 determines whether or not the execution of the print job acquired in step S1104 is complete. Specifically, the CPU 202 determines that the job execution is complete if the job state managed by the print control unit 302 has transitioned to the completed state. If the job state has transitioned to the completed state, the processing moves to step S1113, and if the job state has not transitioned to the completed state, the processing moves to step S1106.

In step S1113, the CPU 202 stores, in the storage unit 305, history information in which information indicating a success as an execution result, and bibliographic information of the job (e.g., the number of pages, the number of copies, the execution time, the document name, and the name of the user who made the input) are associated with each other. Furthermore, the CPU 202 transmits, to the server 102 (CPS 102), a request for changing the job state of the job that was completely printed to "completed". The CPS 102 changes, based on this request, the job state managed on the cloud to the "completed" state, which indicates normal completion. When the processing for storing the history is complete, the CPU 202 moves to the processing in step S1106.

In step S1106, the CPU 202 determines whether or not the event notification includes a change event for the job state. Note here that a description will be made assuming that a cancellation request is transmitted as the change event. Control of other change events (e.g., changing to the temporarily stopped state) is omitted due to limitations of space, but the job state only needs to transition to the state that corresponds to the change event. The CPU 202 moves to the processing in step S1107 if the event notification includes a change event including a request for cancelling the job, and moves to the processing in step S1101 if the event notification does not include the change event including the request for cancelling the job.

In step S1107, the print control unit 302 determines whether or not a print job for which cancellation was requested is a print job that stands by in the print waiting state. Specifically, the print control unit 302 specifies the job to be managed on the printing apparatus 101, based on the job specifying information (for example, "job-id") included in the cancellation request, and acquires the state of the job. If the state of the job is in the print waiting state, the processing moves to step S1109, and otherwise the processing moves to step S1108. Subsequently, in step S1108, the print control unit 302 determines whether or not the print job for which cancellation was requested is a job under execution of printing of the printer 207. If it is the job under execution of printing, the processing moves to step S1109, and otherwise the processing moves to step S1112. For example, if the print job for which cancellation was requested is already normally completed, the procedure will move to step S1112.

In step S1109, the print control unit 302 cooperates with the image processing unit 306, the print processing unit 307, and the printer 207 to start processing for stopping the job for which cancellation was requested. Note that upon completion of the stop processing started in step S1109, the CPU 202 stores, in the storage unit 305, history information in which the result of the stop processing and the bibliographic information of the job are associated with each other.

Subsequently, in step S1110, the CPU 202 determines, based on the progress situation of the job, whether or not cancellation processing can be performed in time. If the cancellation processing can be performed in time and cancellation can be made before the start of the actual printing, and if midway cancellation (stop) can be made during the execution of the printing, the processing moves to step S1111. On the other hand, if it is determined that cancellation processing cannot be performed in time, and output of the deliverable intended by the job should be normally completed, the processing moves to step S1112. For example, the CPU 202 determines that the output should be completed if the image formation, fixation processing, and the like with respect to the last page are completed, and the job will be completed only with the final processing for discharging the printed material. Note that, in place of the determination processing in step S1110, it is also possible to wait for the result of the stop processing being settled and determine, based on the result of the stop processing, whether or not the job has been stopped in time.

In step S1111, the CPU 202 transmits, using an Update-Job-Status request, a notification relating to a change in the state of the job for which cancellation was requested to the cancelled state ("cancelled") to the server 102 (CPS 102). This notification includes, for example, the print result when the job has reached error completion such as the number of pages finally printed. The CPS 102 that has received this notification changes the state of the job to the "stopped state" and stores the history information indicating the execution result of this job.

In step S1112, the CPU 202 requests, using an Update-Job-Status request, the server 102 (CPS 102) to update the state of the job for which cancellation was requested to the normally completed state. It is assumed that this request includes information indicating that the cancellation has not been made in time described in step S933 in FIG. 9. The CPS 102 transitions the job to the normal state in accordance with this request, and stores the history information of the job.

Subsequently, in step S1114, the login control unit 309 determines whether or not an event of local login of a user or an event of log out of the locally logged-in user has occurred. If the log-in event or the log-out event has occurred, the processing moves to step S1115, and if the log-in event or the log-out event has not occurred, the processing moves to step S1116.

In step S1115, the login control unit 309 cooperates with the authentication control unit 304, the operation control unit 300, and the panel 211 to execute the local login processing or the log out processing of the user. If the login processing is performed, a corresponding screen (for example, a main menu screen for selecting functions) is displayed to the user. If the log out processing is performed, a login screen for waiting for a log-in event is displayed.

In step S1116, the CPU 202 determines whether or not a user operation to reference the job history has been accepted. If it is determined that the user operation to reference the job history has been accepted via the panel 211, the processing moves to step S1117, and if it is determined that no user operation to reference the job history has been accepted via the panel 211, the processing moves to step S1118.

Figure 12A:
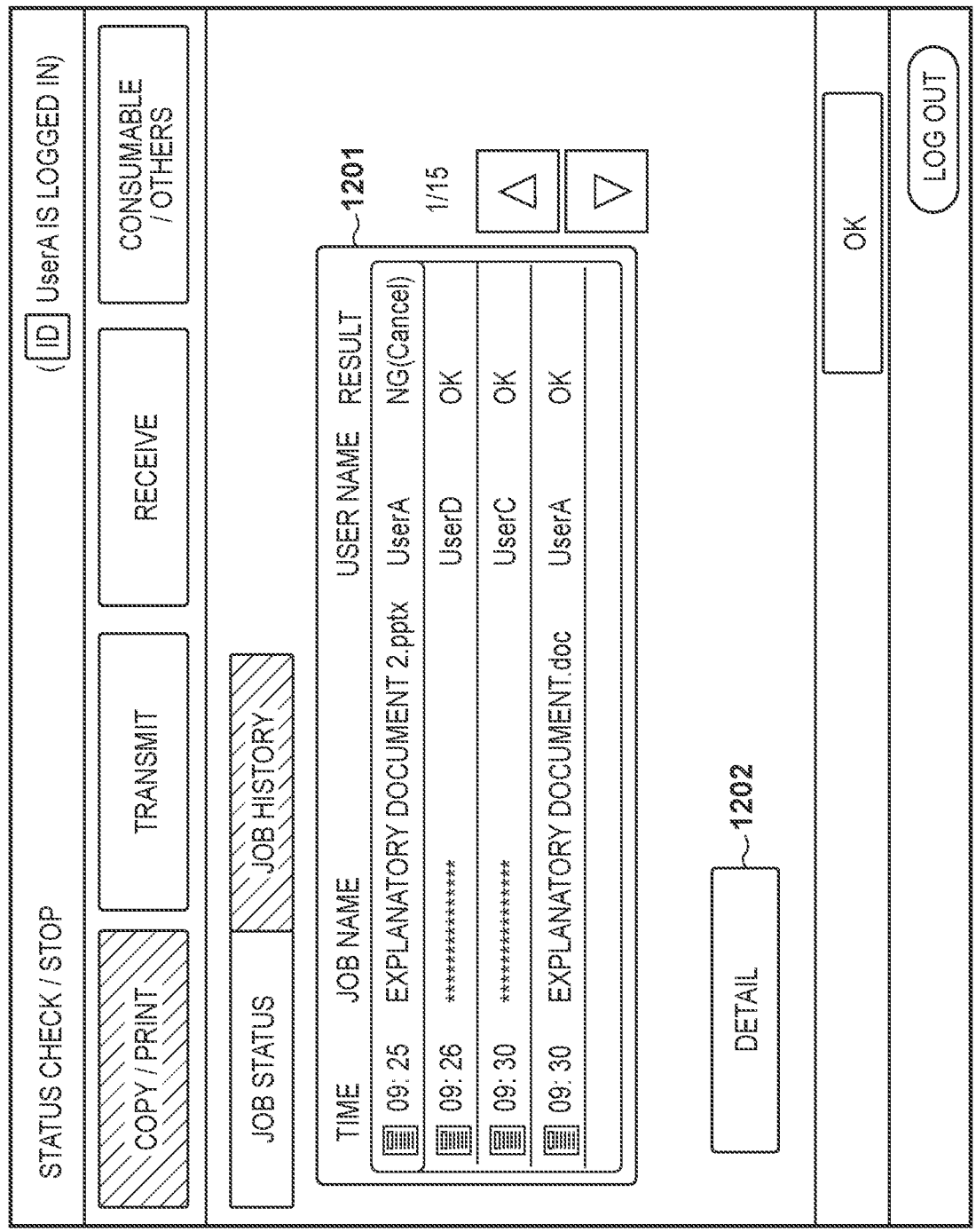
FIGS. 12A and 12B illustrate examples of screens displayed on an operation panel 211 of the printing apparatus 101.
Figure 12B:
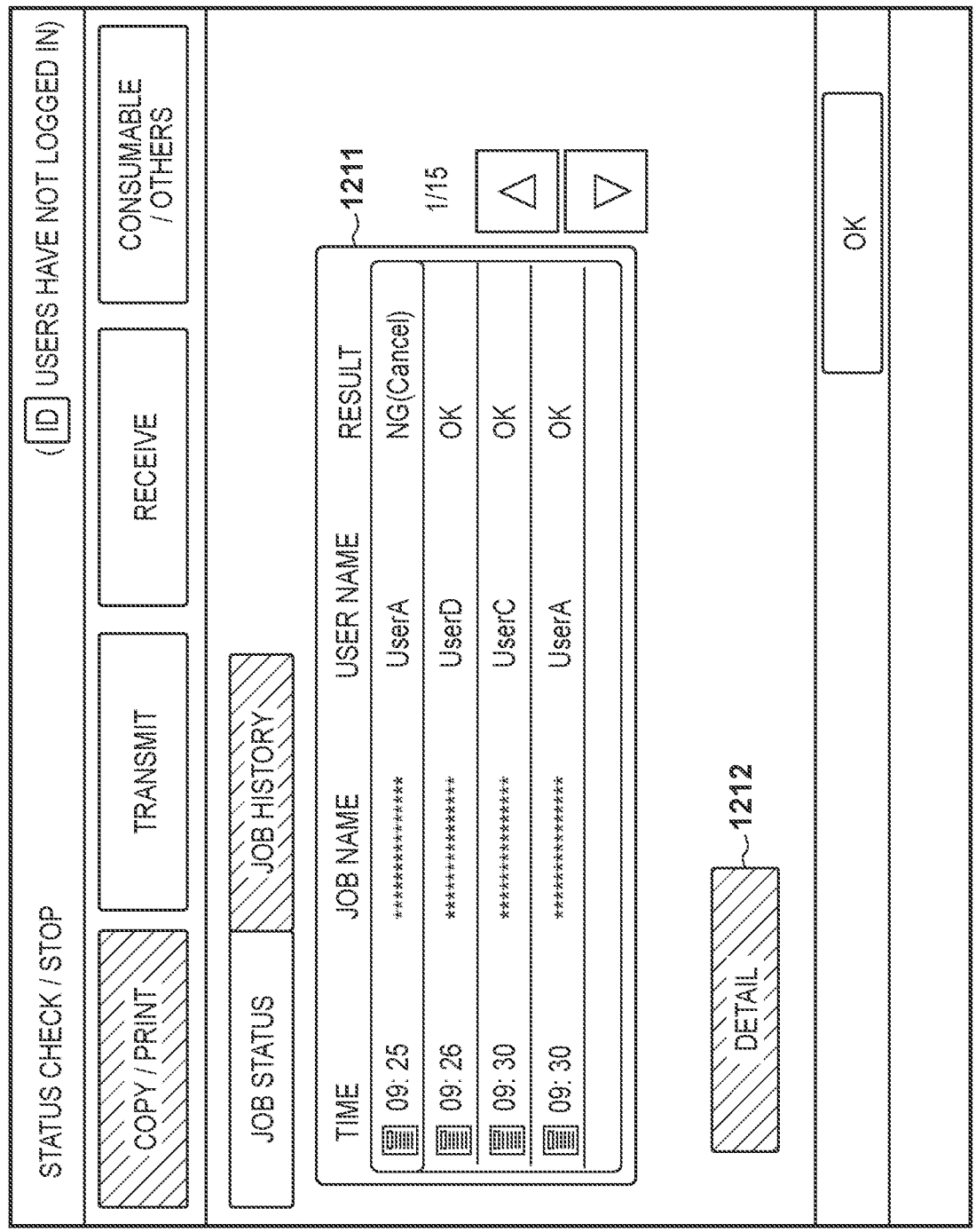

In step S1117, the operation control unit 300 cooperates with the panel 211 to display a screen for checking the job history. The screen displayed in step S1117 will be described with reference to FIGS. 12A and 12B. FIGS. 12A and 12B show examples of the screen displayed on the panel 211 of the printing apparatus 101.

FIG. 12A shows an example of the screen that is displayed when the user operation to reference the job history is accepted in a state in which a "user A" has logged in in the processing of step S1115. A region 1201 is a display region that displays a list of the history information of the job.

In this screen, the job history of the user who has locally logged in the printing apparatus 101 is displayed so that the job names can be checked, and information of the job histories of other users is displayed in a masked state so that the job name cannot be checked, in view of security. Also, a detail key 1202 is a key for use when detailed information (such as the number of printed pages) of the job is checked. The CPU 202 controls display of the screen so that, in view of security, it is not possible to check detailed information of jobs executed by other users. For example, if a job of another user is selected from the list, the key 1202 transitions to a gray out state.

On the other hand, FIG. 12B shows an example of the screen that is displayed when the user operation to reference the job history is accepted in a log-out state in which the user has logged out. In this case, display is made such that all of job names cannot be checked as shown in the region 1211. Also, the CPU 202 displays a detail key 1212 in the gray out state, and performs display control so that it is not possible to check detailed information. Note that a configuration is also possible in which if a user who has the administrative right has logged in, a screen is displayed that allows the job names or detailed information of all of the users to be checked. That is to say, it is possible to display job histories in different format between when a user has logged in and when the user has not logged in.

Referring back to the description of FIG. 11B. In step S1118, the CPU 202 determines whether or not a shutdown event has occurred. If it is determined that the shutdown event has occurred, the printing apparatus 101 executes shutdown processing and turns the printing apparatus 101 off. If it is determined that no shutdown event has occurred, the processing moves to step S1101, where the printing apparatus 101 waits for a further event or a user operation.

According to the above-described first embodiment, when an instruction to cancel the execution of a print job is received from a server, a notification of an appropriate actual execution result of the print job can be given to the server based on the progress situation of the job. Also, the state of the job can be appropriately updated on the server in response to the notification, and the actual execution result of the print job can be saved as history information. Accordingly, it is possible to correctly manage the history information on both the server 102 and the printing apparatus 101.

Second Embodiment

A second embodiment will describe a mechanism that performs, in addition to the various types of control described in the first embodiment, control for purposely shortening a polling interval for an event notification during reception and execution of a job. Note that the system configuration, the hardware configuration, and the software configuration are the same as those in the first embodiment.

The processes of a flowchart shown in FIG. 13 are realized by the processor of the server 102, serving as a real resource for providing services of the CPS 102, executing a program. In FIG. 13, control relating to event notification and cancellation-related job state management executed by the CPS 102 will be extracted and described.

In step S1300, the server 102 determines whether or not an event notification request has been received in a state in which a print job printable by the printing apparatus 101 is input to the CPS 102. If it is determined that an event notification request has been received in a state in which the print job is input, the processing moves to step S1301. If it is determined that an event notification request has been received in a state in which the print job is not input, an event notification response is transmitted at a normal interval as described with reference to FIG. 5, and the processing moves to step S1302.

In step S1301, the server 102 transmits a response to the event notification that the polling interval has been changed to an interval shorter than the normal interval. The CPS 102 that has received this response will transmit the next event notification request at the new notified interval. Accordingly, the polling interval can be shortened during the execution of a job. For example, the interval of 5 seconds or the like can be set.

In step S1302, if the server 102 accepts a user operation to cancel the job, the processing moves to step S1303, and otherwise the processing moves to step S1304. Subsequently, in step S1303, the server 102 changes the state of the job for which cancellation was requested to the temporarily stopped state described with reference to FIGS. 8 and 10.

In step S1304, the server 102 determines whether or not a request for updating the job to the final state has been received from the printing apparatus 101. If it is determined that the request has been received, the processing moves to step S1305, whereas if it is determined that the request has not been received, completion of the print processing or cancellation processing on the printing apparatus described with reference to FIGS. 11A and 11B is waited for. In step S1305, the server 102 updates the status of the job to the final state based on the received execution result. In step S1305, the server 102 updates the state of the job that corresponds to the request in step S1304 to the final state. In step S1306, the server 102 stores, in the storage area, history information indicating the execution result of the job that was updated to the final state in step S1305.

Ultimately, in step S1307, the server 102 switches the polling interval to the normal interval.

Upon receiving a next event notification request, this polling interval is given to the printing apparatus as a response to this request. Note that the CPS 102 may also change the switching timing in the following manner if there are print jobs that are under printing or are to be printed in the print queue for the printing apparatus 101 managed on the cloud. For example, a configuration is also possible in which the processing in step S1307 is performed when all of the jobs that are under printing or are to be printed in the printing apparatus 101 are in the completed state.

With the above-described processing, it is possible to shorten the polling interval during the reception and execution of a job. Accordingly, it is possible to promptly give a cancellation request to the printing apparatus 101 while correctly storing history information.

Third Embodiment

A third embodiment will describe a mechanism that promptly receives a cancellation request from the CPS 102 with communication control different from that in the second embodiment. Note that the system configuration, the hardware configuration, and the software configuration are the same as those in the first embodiment. In the third embodiment, by performing inquiry different from event notification on the printing apparatus 101 side, the printing apparatus 101 recognizes the existence of a cancellation request. FIG. 14 shows a sequence of communication control in place of that of the first embodiment shown in FIG. 6. Descriptions of the same operations as those in the first embodiment will be omitted as appropriate.

Figure 6:
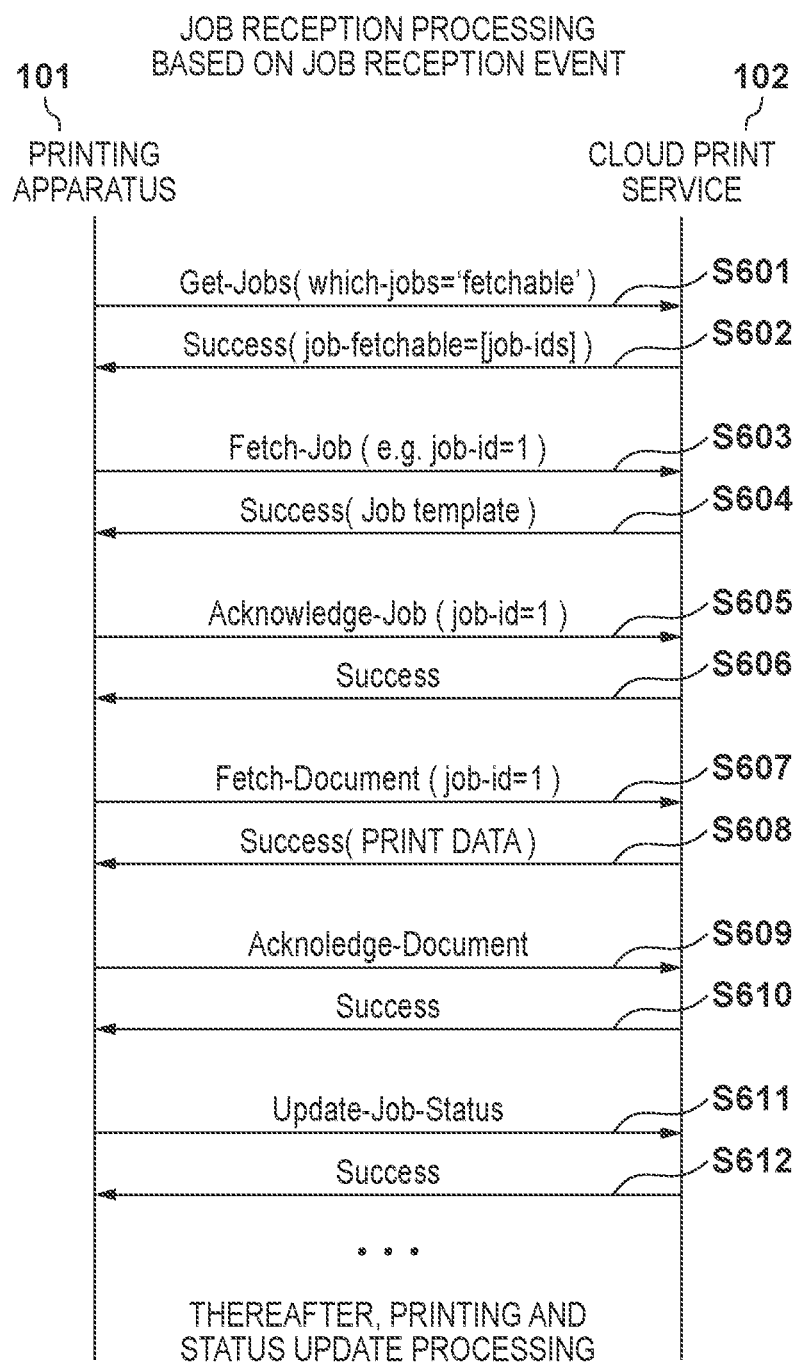
FIG. 6 is a diagram illustrating an example of a sequence of receiving a job.

FIG. 14 differs from FIG. 6 in that a control sequence is added in which when the printing apparatus 101 actively notifies the CPS 102 of information relating to a job such as the update of the job status, it is monitored whether or not this job has not been cancelled.

The printing apparatus 101 transmits, before transmitting various types of requests regarding the print job, a get-job-attributes request to the CPS 102 to check whether or not this job has not been cancelled. This is a request for acquiring attribute information of the job. For this request, the job-id of the job whose job status is to be updated or that is to be subjected to the next operation (for fetching settings or data) is set (step S1421).

The CPS 102 that has received this request responds to the printing apparatus 101 with the attribute information of the job (step S1422). It is assumed that this attribute information includes a status message, which indicates the status (state) of the job managed on the cloud, and information indicating the reason for the transition to this state. Accordingly, the printing apparatus 101 can promptly check whether or not a cancellation request has been given, based on such responses. This monitoring sequence is executed at a timing at which the job is fetched, a timing at which settings are received, a timing at which print data is fetched, and a timing at which the job status (such as the number of printed sheets) is updated.

Figure 15:
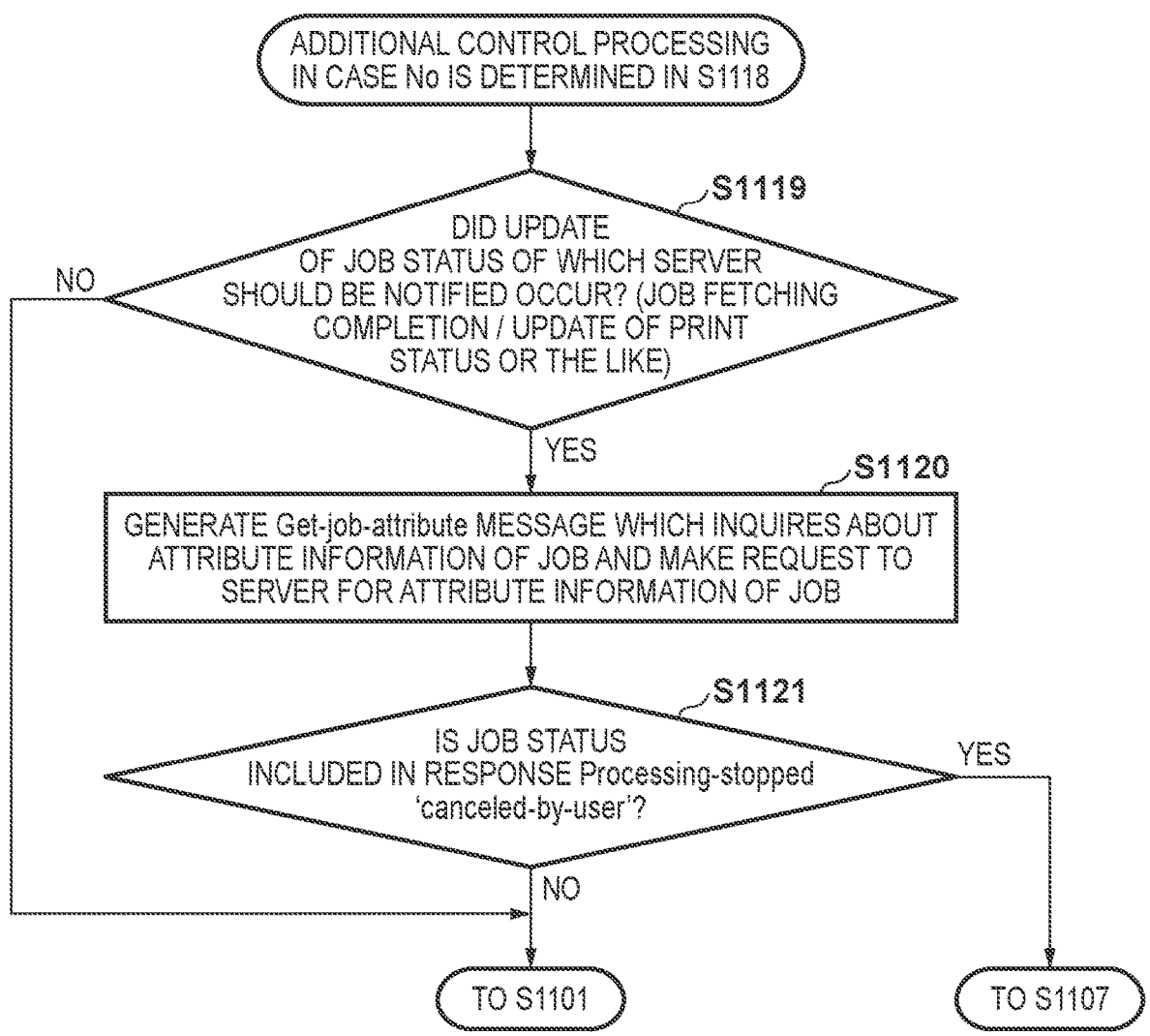
FIG. 15 is a diagram illustrating an example of a flowchart executed by the printing apparatus 101 in the third embodiment.

A specific control method will be described with reference to FIG. 15. FIG. 15 shows a flowchart in which control is extracted that is additionally added to the flowchart of the first embodiment shown in FIGS. 11A and 11B in order to perform the above-described monitoring.

The CPU 202 that repeats the operation for waiting for the various types of events and operations described with reference to FIGS. 11A and 11B further executes monitoring processing from steps S1119 to S1121 if the determination in step S1118 shown in FIG. 11B results in NO.

In step S1119, the CPU 202 determines whether or not update of the job status of which the server is to be notified is needed. If it is determined that the update of the job status is needed, the processing moves to step S1120, and if it is determined that the update is not needed, the processing moves to step S1101 in FIG. 11A.

In step S1120, the CPU 202 generates a get-job-attributes message with the job-id of the job is designated, the job being a job for which it is determined in step S1119 that update of the job status is needed, and requests the server 102 (CPS 102) to transmit the attribute information of the job.

Subsequently, in step S1121, the CPU 202 determines whether or not the job status included in a response received from the CPS 102 is the temporarily stopped state, and includes information indicating that the job has been cancelled by a user. If it is determined that the job is in the temporarily stopped state, and includes information indicating cancellation by a user, the CPU 202 moves to the cancellation processing from steps S1107 onwards. On the other hand, if it is determined that the job is not in the temporarily stopped state, the CPU 202 moves to the processing in step S1101.

With the above-described control, it is possible to promptly check that a cancellation has been requested from the CPS 102 side. Accordingly, it is possible to promptly perform job cancellation processing while correctly storing history information.

Fourth Embodiment

In the first embodiment, a case is exemplified in which a job has transitioned to the temporarily stopped state on the CPS 102, and then a Success response indicating that status update of the job has been normally accepted. The fourth embodiment will describe a mechanism that sets information for giving a notification of status inconsistency in response to the success request, and promptly gives a notification that due to a cancellation request, a job is in the temporarily stopped state.

Figure 16:
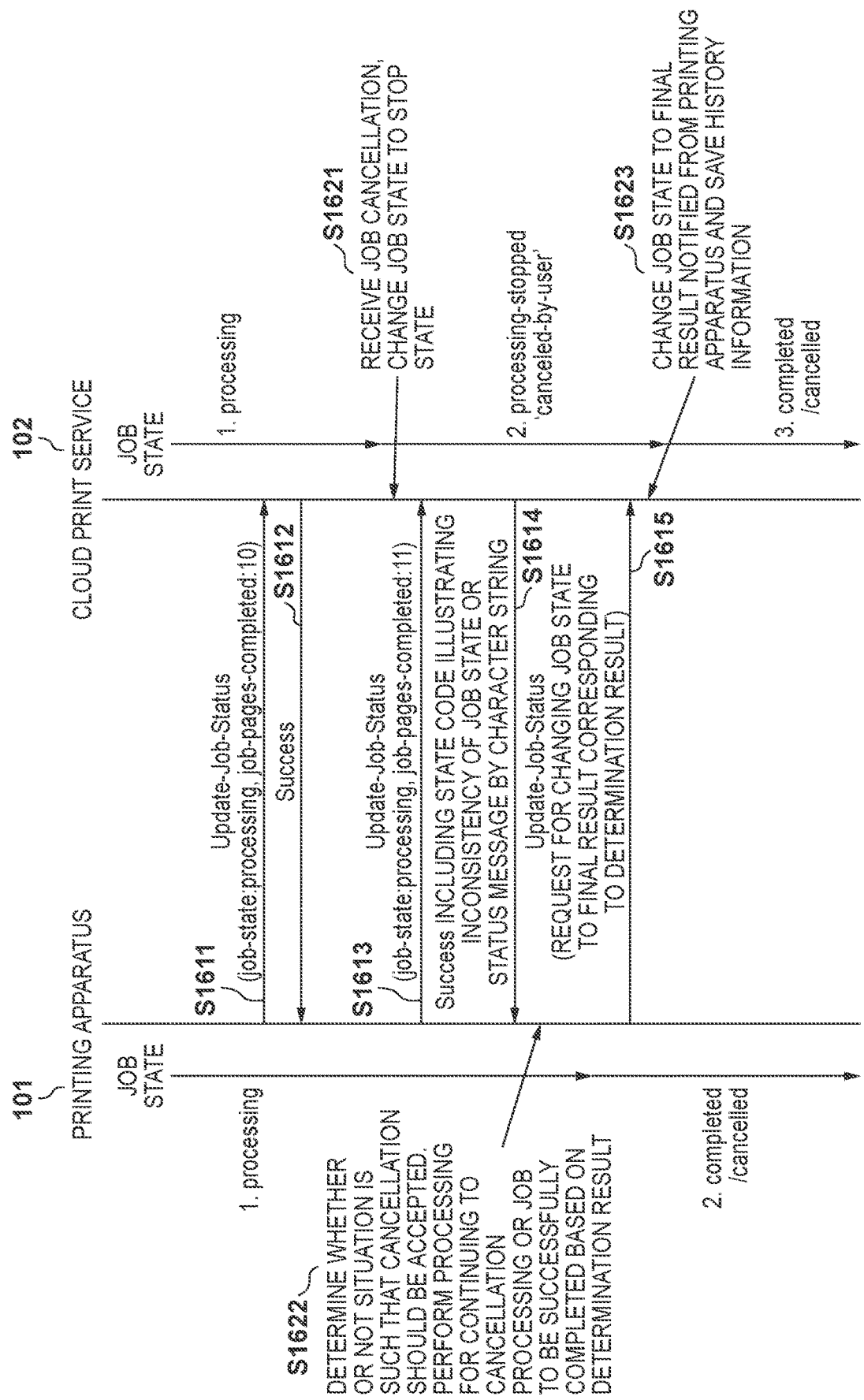
FIG. 16 is a diagram illustrating an example of a sequence of processing for accelerating the detection of job cancellation according to a fourth embodiment.

FIG. 16 is a diagram illustrating a sequence of job cancellation in the fourth embodiment. Control in steps S1611 to S1612 and S1621 are the same as the processing for accepting cancellation during execution of a job described in steps S811 to S812 and S821 in the first embodiment, and thus descriptions thereof are omitted.

In step S1613, the printing apparatus 101 transmits, to the CPS 102, a job status update request indicating that the printing of the eleventh page is complete. The CPS 102 that has received this request updates the progress situation of the stopped job in accordance with the update request.

If it is determined that status update of the job that is waiting for a cancellation and is temporarily stopped is requested based on the job_id included in the update request, the CPS 102 gives a Success status with conditions (with a proviso) in response thereto (step S1614). Specifically, for the Success response, information indicating that inconsistency of the job has occurred is set. This information may be defined as a status code or may be described in a character string using natural language, for example. Alternatively, information for notifying the printing apparatus of the fact that the job is temporarily stopped for waiting for a cancellation may also be included.

The printing apparatus 101 that has received this response determines whether or not cancellation should be accepted based on the information indicating the proviso included in this response (step S1622). This determination processing is the same as the determination processing in the first embodiment described with reference to FIGS. 9 and 11, and thus a description thereof is omitted. The printing apparatus 101 transmits, to the CPS 102, a request for updating the job state on the CPS 102 to the final result based on the determination result in step S1622 (step S1615). The CPS 102 that has received this request updates the job state managed on the CPS 102 based on the final result given from the printing apparatus. Also, the history information that correspond to the job is stored in the storage area (step S1623).

With the above-described control, it is possible to promptly check that a cancellation has been requested from the CPS 102 side. Accordingly, it is possible to promptly perform job cancellation processing while correctly storing history information.

Fifth Embodiment

In the first to fourth embodiments, descriptions have been given taking a case where when a cancellation request has been accepted on the CPS 102 side, a job is temporarily stopped, as an example. In a fifth embodiment, a case is assumed in which immediate cancellation of a job on the cloud is employed on the CPS 102 side, as well as the pull method is employed for event notification. That is to say, a case is assumed in which immediate cancellation of a job is performed on the CPS 102, as described with reference to the sequence in FIG. 7.

The fifth embodiment will describe a method in which, in such a case, the printing apparatus 101 uses information referenceable through communication to deem that an event for which a job should be cancelled has occurred, without waiting for a cancellation notification through event notification. Note that the system configuration, the hardware configuration, and the software configuration are the same as those in the first embodiment.

Specific control executed by the printing apparatus 101 will be described with reference to a flowchart in FIG. 17. The operations (steps) indicated in the flowchart of FIG. 17 are realized by the CPU 202 reading programs for realizing control modules stored in the ROM 204 or the HDD 205 onto the RAM 203 and executing them. Note that in cases where the control modules, which are main components for causing the operations, are clearly described, the operations are described as being executed by the control modules named in the example in FIG. 3. In FIG. 17, control for executing deemed cancellation determination processing based on the response indicating that job information has been updated given to the CPS 102 is extracted. The printing apparatus 101 executes this cancellation determination processing upon receiving a response to an Update-Job-Status from the CPS 102.

In step S1701, the CPU 202 determines whether or not a status code included in the response to the Update-Job-Status indicates a success. If it is determined that the status code indicates a success, the cancellation processing is not performed but the print processing and the job state update processing continue. If it is determined that the status code does not indicate a success (that is, if the status code indicates an error), the processing moves to step S1702. Subsequently, in step S1702, the CPU 202 determines whether or not the character string "job is finished" is included in a detailed-status-message attribute, which indicates the reason for an error. If it is determined that this character string is included, the processing moves to step S1703, and otherwise moves to step S1704. This processing is processing for deeming that an event for which a job should be cancelled has occurred, based on an event, such as the type or detailed description of the error, returned by the CPS.

In step S1703, the CPU 202 displays information indicating a job execution error on the panel 211, and ends the series of cancel determination processing. On the other hand, in step S1704, the CPU 202 cancels the execution of a job whose job status has failed to be updated, and ends the series of processing.

Therefore, even in a case where both immediate cancellation of a job on a server, and event notification with the pull method are used, it is possible to promptly execute job cancellation based on the circumstance. Since application of the present embodiment enables prompt cancellation, it is possible to suppress a difference in job execution results between the printing apparatus 101 and the CPS 102.

According to one aspect of the present disclosure, when an instruction to cancel the execution of a print job is received from a server, it is possible to notify the server of the appropriate actual execution result of the print job based on the progress situation of the job. Accordingly, history information that indicates the actual execution result of the print job can be stored in both the printing apparatus and the server.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-051776, filed Mar. 23, 2020, which is hereby incorporated by reference herein in its entirety.

What is claimed is:

1. A printing system comprising: a server configured to manage print data input from a user; and a printing apparatus configured to receive an event notification from the server, acquire a print job managed by the server based on the event notification, and execute print processing, the server comprising:
at least one memory that stores a set of instructions; and
at least one processor that executes the instructions, the instructions, when executed, causing the server to perform operations comprising:
transitioning, when a request for cancelling the print job managed by the server is received and an execution state of the print job for which cancellation was requested is managed as being an under-execution state, the execution state of the print job for which cancellation was requested into a temporarily stopped state;
transmitting, to the printing apparatus that has acquired the print job for which cancellation was requested, information indicating that printing of the print job should be cancelled; and
storing, when the execution state of the job managed by the server has transitioned to a completed state, history information that includes an execution result of the print job that has transitioned to the completed state,
the printing apparatus comprising:
at least one memory that stores a set of instructions; and
at least one processor that executes the instructions, the instructions, when executed, causing the printing apparatus to perform operations comprising:
determining, upon receiving the information indicating that printing of the print job should be cancelled from the server after the start of the print processing of the acquired print job, whether the cancellation should be accepted based on a progress situation of the processing on the print job;
in a case where it is determined that the cancellation should be accepted, cancelling and terminating the execution of the print processing and notifying the server of an execution result indicating that the processing on the print job has been cancelled, and in a case where it is determined that the cancellation should not be accepted, notifying the server of an execution result indicating that output of the print job has been completed; and
storing, when the execution of the print job has been completed, the execution result,
wherein the instructions of the server further include an instruction for transitioning the execution state of the print job for which cancellation was requested into a state indicating successful completion or a state indicating termination by cancellation, based on the execution result given from the printing apparatus, and
wherein the instructions of the printing apparatus further include an instruction for notifying the server of the execution result indicating that output of the print job has been completed when the printing of the print job has been successfully completed before cancellation and termination of the execution of the print processing, even in a case where it is determined that the cancellation should be accepted.

2. A printing apparatus configured to receive an event notification from a server, acquire a print job based on the event notification, and execute print processing, the printing apparatus comprising:
at least one memory that stores a set of instructions; and
at least one processor that executes the instructions, the instructions, when executed, causing the printing apparatus to perform operations comprising:
determining, upon receiving information indicating that printing of the print job should be cancelled from the server after the start of the print processing of the acquired print job, whether the cancellation should be accepted based on a progress situation of the processing on the print job;
in a case where it is determined that the cancellation should be accepted, cancelling and terminating the execution of the print processing and notifying the server of an execution result indicating that the processing on the print job has been cancelled, and in a case where it is determined that the cancellation should not be accepted, notifying the server of an execution result indicating that output of the print job has been completed; and
storing, when the execution of the print job has been completed, the execution result,
wherein the instructions further include an instruction for notifying the server of the execution result indicating that output of the print job has been completed when the printing of the print job has been successfully completed before cancellation and termination of the execution of the print processing, even in a case where it is determined that the cancellation should be accepted.

3. The printing apparatus according to claim 2, wherein the instructions further include an instruction for determining that the cancellation should not be accepted in a case where the progress situation of the processing on the print job indicates that the printing has been successfully completed.

4. The printing apparatus according to claim 2, wherein the instructions further include an instruction for giving a job attribute acquisition request to the server at an interval shorter than an interval at which the event notification is acquired, during the execution of the print processing of the print job acquired from the server,
the information indicating that printing of the print job should be cancelled being received from the server as a response to this request.

5. The printing apparatus according to claim 2, wherein the instructions further include instructions for
authenticating a user who uses the printing apparatus,
causing the user who is successfully authenticated to log in the printing apparatus, and
displaying, upon receiving a predetermined user operation after the user has logged in the printing apparatus, a screen indicating the stored execution result of the print job.

6. The printing apparatus according to claim 5, wherein the screen is displayed in a display format in which with respect to a print job of the logged-in user, a job name for specifying a file to be printed and an execution result are displayed in association with each other, and with respect to a print job of a user different from the logged-in user, information indicating an execution result is displayed without a job name for specifying a file to be printed.

7. The printing apparatus according to claim 6, wherein the instructions further include an instruction for displaying, in a case where the predetermined user operation is received in a state in which a user has not logged in the printing apparatus, the screen in a display format in which information indicating an execution result of a job is displayed without a job name for specifying a file to be printed.

8. A method for controlling a printing apparatus configured to receive an event notification from a server, acquire a print job based on the event notification, and execute print processing, the method comprising:

determining, upon receiving information indicating that printing of the print job should be cancelled from the server after the start of the print processing of the acquired print job, whether the cancellation should be accepted based on a progress situation of the processing on the print job;

in a case where it is determined that the cancellation should be accepted, cancelling and terminating the execution of the print processing and notifying the server of an execution result indicating that the processing on the print job has been cancelled, and in a case where it is determined that the cancellation should not be accepted, notifying the server of an execution result indicating that output of the print job has been completed;

storing, when the execution of the print job has been completed, the execution result; and notifying the server of the execution result indicating that output of the print job has been completed when the printing of the print job has been successfully completed before cancellation and termination of the execution of the print processing, even in a case where it is determined that the cancellation should be accepted.

9. A non-transitory computer-readable storage medium that stores a program for causing a computer to execute a method for controlling a printing apparatus configured to receive an event notification from a server, acquire a print job based on the event notification, and execute print processing, wherein the method comprising:

determining, upon receiving information indicating that printing of the print job should be cancelled from the server after the start of the print processing of the acquired print job, whether the cancellation should be accepted based on a progress situation of the processing on the print job;

in a case where it is determined that the cancellation should be accepted, cancelling and terminating the execution of the print processing and notifying the server of an execution result indicating that the processing on the print job has been cancelled, and in a case where it is determined that the cancellation should not be accepted, notifying the server of an execution result indicating that output of the print job has been completed;

storing, when the execution of the print job has been completed, the execution result; and notifying the server of the execution result indicating that output of the print job has been completed when the printing of the print job has been successfully completed before cancellation and termination of the execution of the print processing, even in a case where it is determined that the cancellation should be accepted.

10. A printing apparatus configured to receive an event notification from a server, acquire a print job based on the event notification, and execute print processing, the printing apparatus comprising:

at least one memory that stores a set of instructions; and at least one processor that executes the instructions, the instructions, when executed, causing the printing apparatus to perform operations comprising:

receiving a cancellation notification indicating that the print processing of the acquired print job should be cancelled from the server in response to sending a status update request for the print job during the execution of the print processing of the print job; and cancelling the print processing of the print job about which the cancellation notification is received and whose print processing is not completed, and sending information indicating that the print job is canceled, wherein information indicating that the print processing is completed is sent for the print job about which the cancellation notification is received and whose print processing is completed, and wherein in a case where a state of the print job is displayed in a state in which a user has not logged in to the printing apparatus, an execution result of the print job is displayed and a job name of the print job is not displayed.

* * * * *